US011526016B1

(12) United States Patent
Gao et al.

(10) Patent No.: US 11,526,016 B1
(45) Date of Patent: Dec. 13, 2022

(54) SPATIAL LIGHT MODULATOR DISPLAYS WITH DIVERGENCE CORRECTION LENS

(71) Applicant: META PLATFORMS TECHNOLOGIES, LLC, Menlo Park, CA (US)

(72) Inventors: Weichuan Gao, Redmond, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 273 days.

(21) Appl. No.: 16/920,202

(22) Filed: Jul. 2, 2020

(51) Int. Cl.
G02B 27/28 (2006.01)
G02B 27/01 (2006.01)
G02B 17/08 (2006.01)
F21V 8/00 (2006.01)
G02F 1/1362 (2006.01)

(52) U.S. Cl.
CPC ......... *G02B 27/0176* (2013.01); *G02B 6/005* (2013.01); *G02B 6/0026* (2013.01); *G02B 17/0856* (2013.01); *G02B 27/0172* (2013.01); *G02B 27/283* (2013.01); *G02B 2027/015* (2013.01); *G02B 2027/0178* (2013.01); *G02F 1/136277* (2013.01); *G02F 2203/12* (2013.01)

(58) Field of Classification Search
CPC .. G02B 6/0026; G02B 6/005; G02B 17/0856; G02B 27/0172; G02B 27/017; G02B 27/283; G02B 2027/015; G02B 2027/0178; G02F 1/136277; G02F 2203/12
See application file for complete search history.

(56) References Cited

U.S. PATENT DOCUMENTS

| 2013/0242392 A1* | 9/2013 | Amirparviz .......... G02B 5/3025 359/485.05 |
| 2016/0208999 A1 | 7/2016 | Jurik |
| 2018/0067315 A1* | 3/2018 | Amitai ............... G02B 27/0101 |
| 2018/0284585 A1 | 10/2018 | Trisnadi et al. |
| 2019/0041642 A1 | 2/2019 | Haddick et al. |
| 2019/0171005 A1* | 6/2019 | Lee ................... G02B 27/0037 |
| 2019/0179149 A1* | 6/2019 | Curtis ................ G02B 27/0176 |

(Continued)

FOREIGN PATENT DOCUMENTS

CN    110068927 A  *  7/2019  ......... G02B 27/0101

OTHER PUBLICATIONS

Non-Final Office Action dated Apr. 1, 2022 for U.S. Appl. No. 16/920,208, filed Jul. 2, 2020, 16 pages.

(Continued)

*Primary Examiner* — Hoan C Nguyen
(74) *Attorney, Agent, or Firm* — Morgan, Lewis & Bockius LLP

(57) ABSTRACT

An optical device includes a spatial light modulator configured to project image light, a diffractive lens, and a polarization-selective reflector. The spatial light modulator defines an optical axis. The diffractive lens is positioned to receive the image light from the spatial light modulator. The polarization-selective reflector is positioned to receive the image light from the diffractive lens. The polarization-selective reflector having a polarization-selective reflective surface in an orientation that is non-perpendicular to the optical axis of the spatial light modulator.

20 Claims, 18 Drawing Sheets

(56) References Cited

U.S. PATENT DOCUMENTS

2020/0209667 A1  7/2020  Sharlin et al.
2020/0249480 A1* 8/2020  Martinez ........... G02F 1/133528

OTHER PUBLICATIONS

Notice of Allowance dated Jul. 18, 2022 for U.S. Appl. No. 16/920,208, filed Jul. 2, 2020, 5 pages.
Non-Final Office Action dated Oct. 5, 2022 for U.S. Appl. No. 16/926,444, filed Jul. 10, 2020, 15 pages.

* cited by examiner

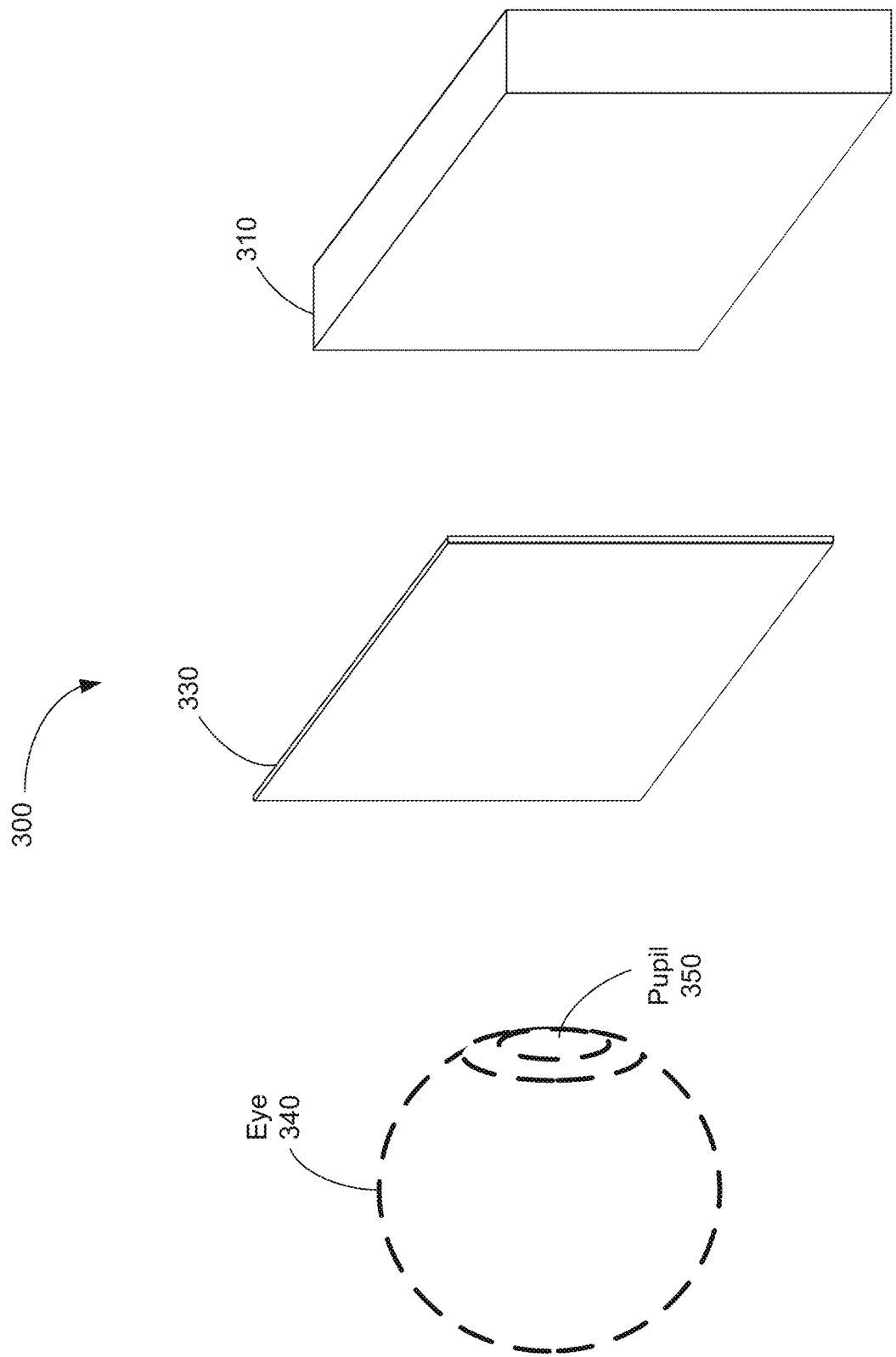

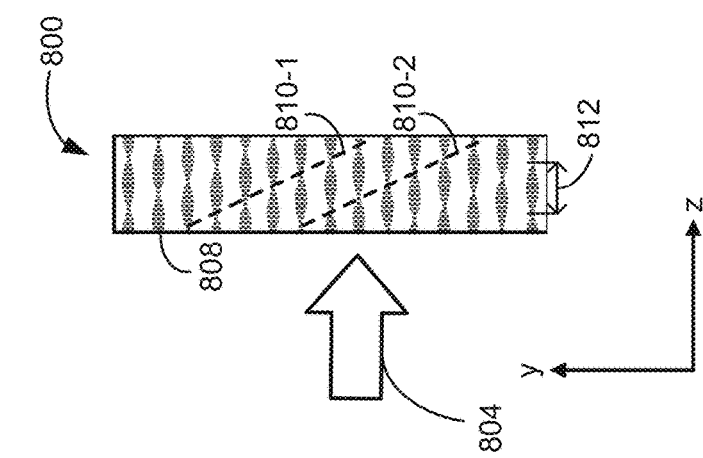
Figure 8C
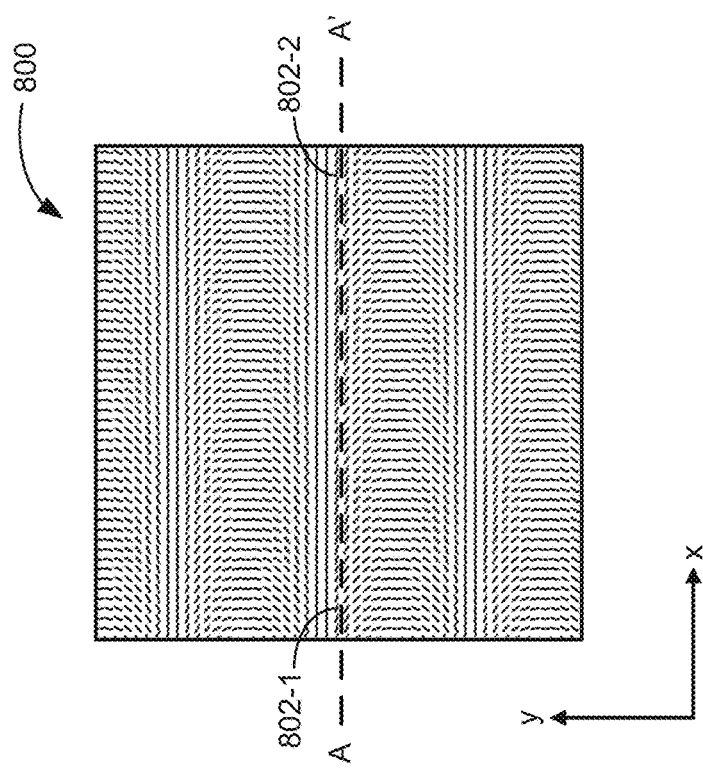
Figure 8B
Figure 8D
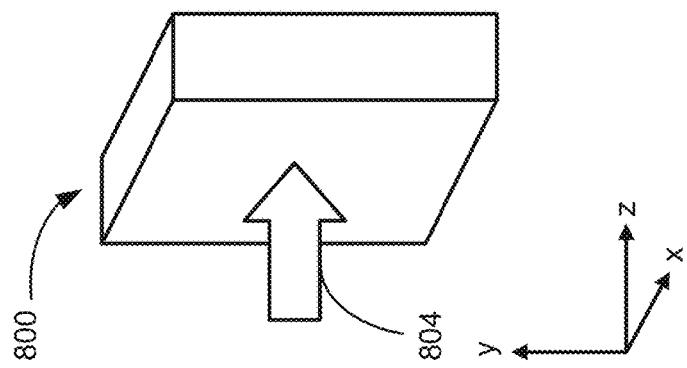
Figure 8A
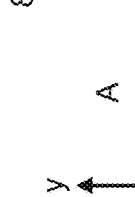

SPATIAL LIGHT MODULATOR DISPLAYS WITH DIVERGENCE CORRECTION LENS

RELATED APPLICATIONS

This application is related to U.S. patent application Ser. No. 16/920,208, entitled "Spatial Light Modulator Displays with Diffractive Optical Elements" which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality, mixed reality, and augmented reality operations.

However, there is a need for high resolution, compact-sized and light-weighted display systems for enhancing user's experience with head-mounted display devices.

SUMMARY

Spatial light modulators (SLM) have high brightness and high efficiency. However, incorporating spatial light modulators into head-mounted devices can be challenging. Several challenges in incorporating spatial light modulators in head-mounted devices are addressed by the disclosed devices and methods.

In accordance with some embodiments, an optical device includes a first waveguide having a first side and an opposing second side, a spatial light modulator configured to project image light, one or more lenses disposed between the spatial light modulator and the first waveguide, and a first in-coupler coupler coupled with the first waveguide. The spatial light modulator is positioned on the first side of the first waveguide. The first in-coupler is positioned to receive the image light projected by the spatial light modulator and transmitted through the one or more lenses and to redirect at least a first portion of the image light so that the first portion of the image light enters the first waveguide and undergoes total internal reflection inside the first waveguide.

In accordance with some embodiments, a head-mounted display device includes the optical device and one or more output couplers coupled with the first waveguide and positioned at a distance from the first in-coupler. The one or more output couplers are configured to redirect the first portion of the image light out of the first waveguide.

In accordance with some embodiments, a method is performed at an optical device. The method includes projecting, with a spatial light modulator, image light, and receiving, with a first in-coupler coupled with a first waveguide, the image light projected by the spatial light modulator and transmitted through one or more lenses. The method also includes redirecting, with the first in-coupler, at least a first portion of the image light so that the first portion of the image light enters the first waveguide and undergoes total internal reflection inside the first waveguide. The first waveguide has a first side and an opposing second side. The spatial light modulator is positioned on the first side of the first waveguide, and the one or more lenses are disposed between the spatial light modulator and the first waveguide.

In accordance with some embodiments, an optical device includes a spatial light modulator configured to project image light, a diffractive lens, and a polarization-selective reflector. The spatial light modulator defines an optical axis. The diffractive lens is positioned to receive the image light from the spatial light modulator. The polarization-selective reflector is positioned to receive the image light from the diffractive lens. The polarization-selective reflector having a polarization-selective reflective surface is positioned in an orientation that is non-perpendicular to the optical axis of the spatial light modulator.

In accordance with some embodiments, a method includes projecting, with a spatial light modulator defining an optical axis, image light, and receiving, with a diffractive lens, the image light from the spatial light modulator. The method also includes receiving, with a polarization-selective reflector, the image light from the diffractive lens. The polarization-selective reflector has a polarization-selective reflective surface positioned in an orientation that is non-perpendicular to the optical axis of the spatial light modulator.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 8A-8D are schematic diagrams illustrating a polarization volume holographic grating in accordance with some embodiments.

Figure 1:
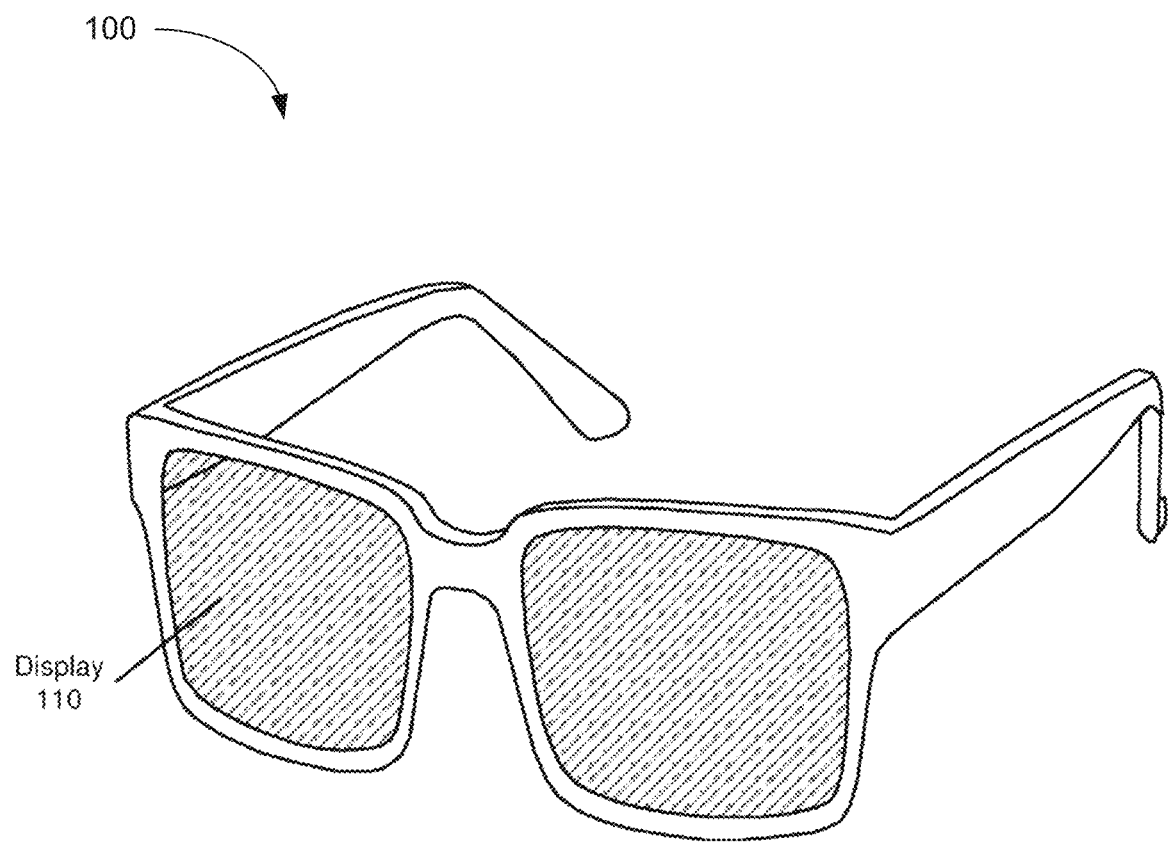
FIG. 1 is a perspective view of a display device in accordance with some embodiments.

These figures are not drawn to scale unless indicated otherwise.

DETAILED DESCRIPTION

Spatial light modulator (SLM) displays have high brightness and high efficiency, and can be used in head-mounted display devices. In addition, reflective spatial light modulators, such as Liquid Crystal on Silicone (LCoS) displays can have a reduced screen door effect (e.g., visibility of gaps between pixels) compared to conventional transmissive displays because circuitry required for pixels can be disposed behind the pixels, rather than around the pixels, thereby allowing a smaller gap between adjacent pixels.

However, spatial light modulators generally require uniform illumination light to provide high quality images and also require projection optics that can couple light from the spatial light modulators to the rest of the head-mounted display devices.

The optical devices of the present disclosure provide for compact and light-weight configurations for projecting image light from SLMs as well as for illuminating the SLMs. Such optical devices are suitable for head-mounted display devices.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
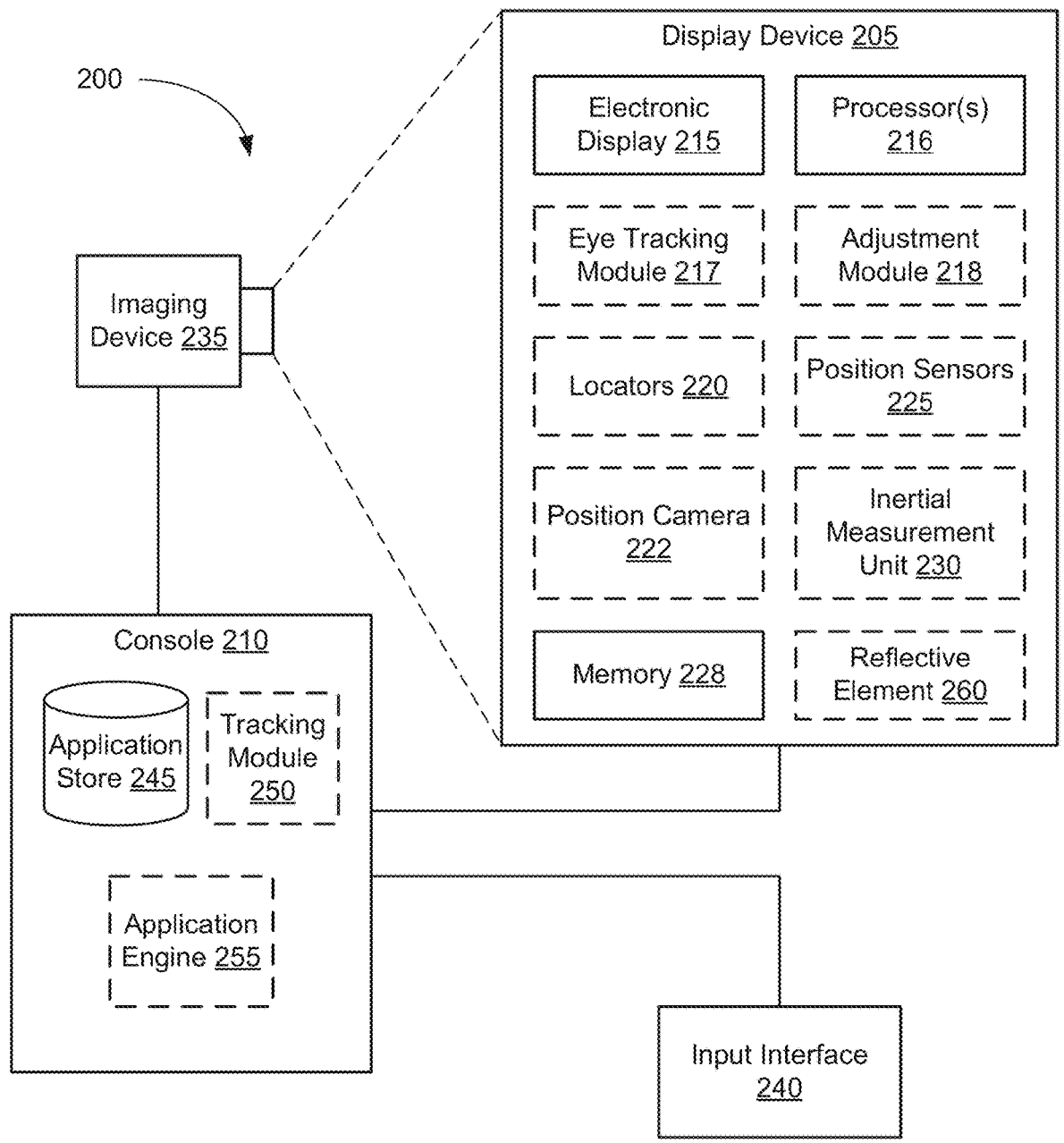
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 (e.g., a light emission device array) and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a reflective spatial light modulator (SLM), such as a Liquid Crystal on Silicon (LCoS) spatial light modulator. The spatial light modulator is configured to modulate an amplitude or phase of at least a portion of illumination light and output modulated light (e.g., image light). The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon). In some embodiments, display device 300 includes multiple reflective spatial light modulators (e.g., a first reflective spatial light modulator for a first color, such as red, a second reflective spatial light modulator for a second color, such as green, and a third reflective spatial light modulator for a third color, such as blue). Such reflective spatial light modulator requires an illuminator that provides light to the reflective spatial light modulator.

Figure 4A:
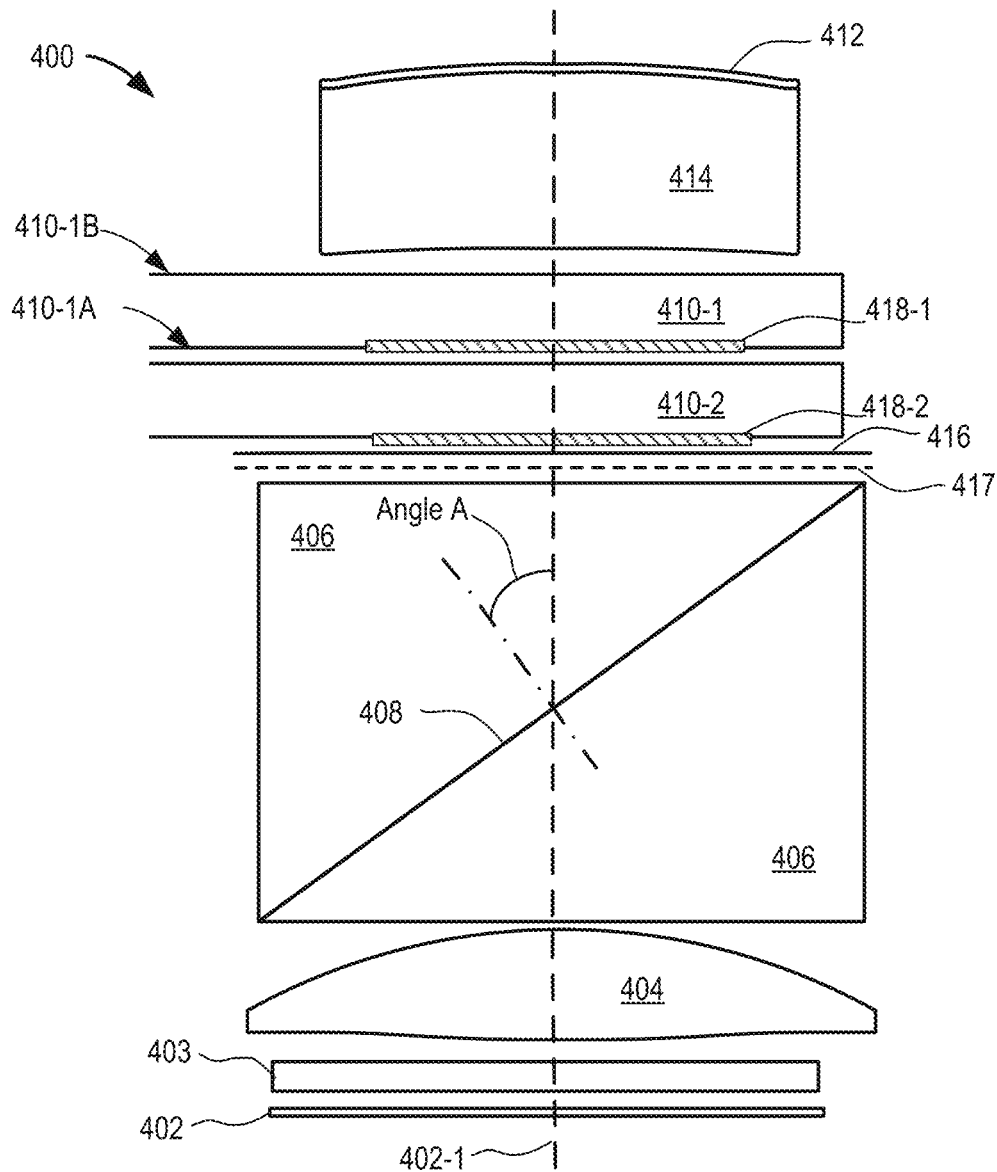
FIGS. 4A and 4B are schematic diagrams illustrating a projection device for outputting image light in accordance with some embodiments.
Figure 4B:
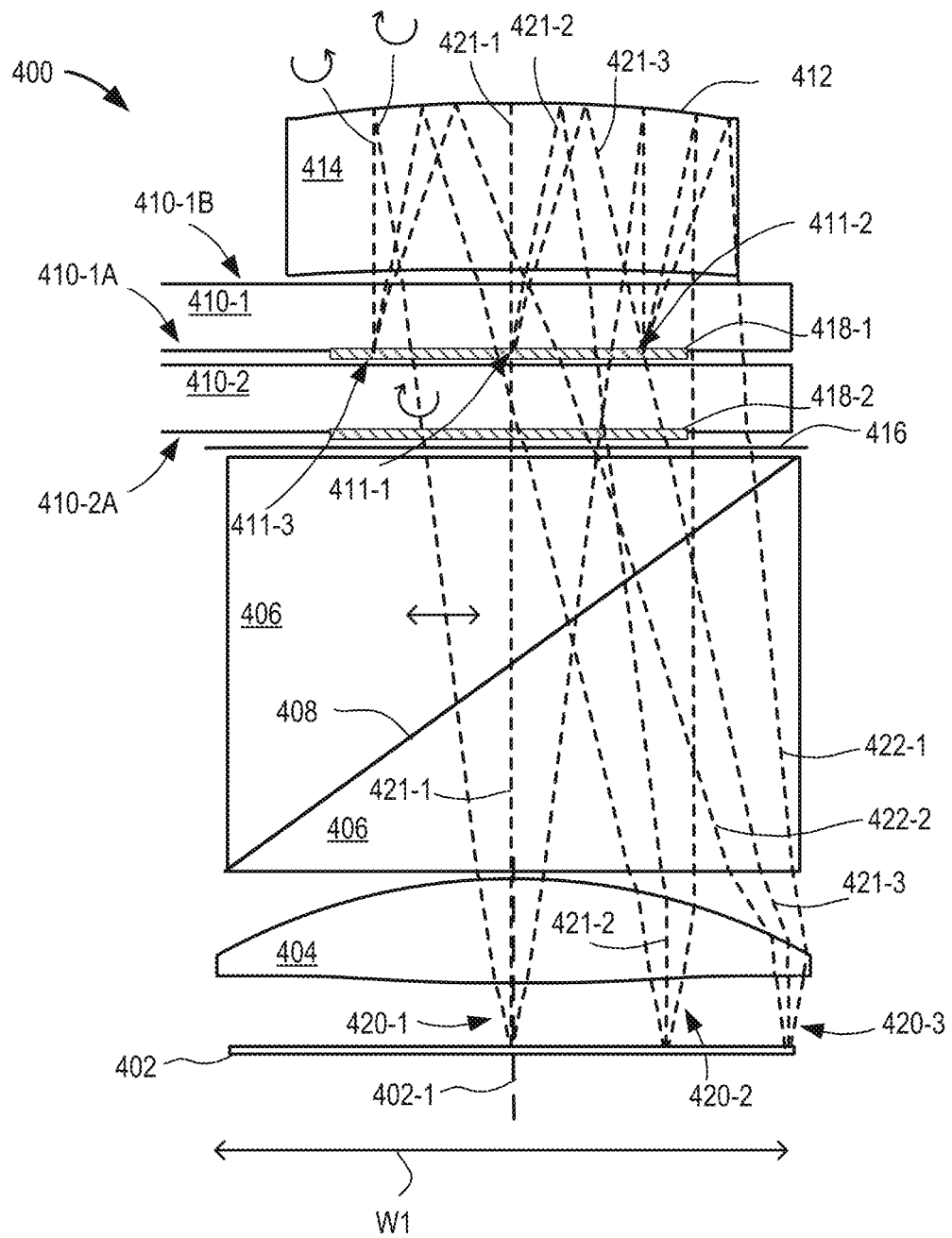

FIGS. 4A and 4B are schematic diagrams illustrating projection device 400 for outputting image light in accordance with some embodiments. Projection device 400 includes spatial light modulator (SLM) 402 (e.g., an LCoS), one or more lenses (e.g., lens 404), and one or more waveguides (e.g., waveguides 410-1 and 410-2), where each waveguide is coupled with a polarization-selective in-coupler (e.g., in-couplers 418-1 and 418-2 that are polarization selective optical gratings). Waveguide 410-1 has first side 410-1A and second side 410-1B opposite to the first side 410-1A. As shown, SLM 402 is facing first side 410-1A of waveguide 410-1 and lens 404 is positioned between SLM 402 and waveguide 410-1. Projection device 400 also includes a reflector (e.g., reflector 412) facing second side 410-1B of waveguide 410-3. In some embodiments, reflector 412 is a reflective surface coupled with a lens (e.g., lens 414). In some embodiments, lens 414 is a negative meniscus lens and reflector 412 has a curved shape.

In some embodiments, projection device 400 further includes polarization-selective reflector 408. Polarization-selective reflector 408 is configured to reflect light having a particular polarization while transmitting light having a polarization distinct from (e.g., orthogonal to) the particular polarization. In some embodiments, polarization-selective reflector 408 is embedded inside cube 406 such that polarization-selective reflector 408 is positioned diagonally inside the cube. Polarization-selective reflector 408 is positioned between SLM 402 and waveguides 410-1 and 410-2. As shown, polarization-selective reflector 408 is positioned non-parallel to optical axis 402-1 of SLM 402. In some embodiments, polarization-selective reflector 408 defines an angle (e.g., angle A) ranging from 30 degrees to 60 degrees with optical axis 402-1 of SLM 402. For example, angle A ranges from 30 to 60 degrees, 40 to 50 degrees, 30 to 40 degrees, 40 to 50 degrees, or 50 to 60 degrees. In some embodiments, angle A is 45 degrees. In some embodiments, SLM 402, lens 404, and reflector 412 coupled with lens 414 are positioned so that they have a substantially common optical axis (e.g., optical axis 402-1 of SLM 402).

In some embodiments, projection device 400 further includes retarder plate 416 (e.g., a quarter-wave plate) positioned between polarization-selective reflector 408 and waveguides 410-1 and 410-2. Retarder plate 416 is configured to convert a linearly polarized light into a circularly polarized light, and vice versa. In some embodiments, projection device 400 also includes a polarizer (e.g., polarizer 417 such as a cleanup polarizer) configured to transmit light having a particular polarization while absorbing light having a polarization distinct from (e.g., orthogonal to) the particular polarization. In some embodiments, polarizer 417 is coupled with, or adjacent to, retarder plate 416 so that the polarizer is positioned between cube 406 and retarder plate 416. In some embodiments, projection device 400 further includes one or more optical elements 403 positioned between SLM 402 and lens 404. In some embodiments, the one or more optical elements 403 include a cover slip for SLM 402. In some embodiments, the one or more optical elements 403 include a lens or a retarder plate (e.g., a half-wave plate).

As shown in FIG. 4B, SLM 402 is configured to project image light (e.g., light 420-1, 420-2, and 420-3 projected from respective locations on SLM 402). In some embodiments, SLM 402 is a reflective spatial light modulator, such as a liquid crystal on silicon (LCoS) display. In some embodiments, the LCoS includes liquid crystals. In some embodiments, the LCoS spatial light modulator includes ferroelectric liquid crystals. SLM 402 is configured to modulate a phase and/or intensity of received illumination light such that the modulated light renders one or more images. In some cases, the modulated light (also called herein the image light) includes a combination of a first polarization and a second polarization. FIG. 4B illustrates a configuration for projecting linearly polarized light. As shown, the first polarization is a first linear polarization and the second polarization is a second linear polarization orthogonal to the first linear polarization. Alternatively, the first polarization is a first circular polarization and the second polarization is a second circular polarization orthogonal to the first linear polarization (e.g., the first circular polarization is right-handed polarization and the second circular polarization is left-handed circular polarization, or vice versa). It is noted that annotations used in the drawings for indicating circular polarization throughout this application are universal for right-handed and left-handed circularly polarized light and do not account for a direction of the light.

For example, image light (e.g., light 420-1, 420-2, and 420-3) projected by SLM 402 includes a first portion having the first linear polarization and a second portion having the second linear polarization. Polarization-selective reflector 408 transmits the first portion of light having the first linear polarization toward waveguides 410-1 and 410-2 and reflects the second portion of light having the second linear polarization. In some embodiments, polarization-selective reflector 408 functions as a selective analyzer that allows only image light with a particular polarization (e.g., image light having the first linear polarization) to be transmitted while blocking (e.g., reflecting) image light with other polarizations. In some embodiments, the image light with the particular polarization (e.g., light 420-1, 4202, and 420-3) renders one or more images based on virtual reality, augmented reality, or mixed reality content to a user.

The image light projected by SLM 402 includes chief rays (e.g., chief rays 421-1, 421-2, and 421-3 of respective light 420-1, 420-2, and 420-3). A chief ray is a ray that extends from a respective position on the spatial light modulator (e.g., respective positions where light 420-1, 420-2, and 420-3 originate on SLM 402) to a center of an aperture, such as a center of in-coupler 418-1 (e.g., the center being indicated with arrow 411-1) or a center of an illuminated portion of a waveguide (e.g., waveguide 410-1 or 410-2). Chief rays 421-1, 421-2, and 421-3 are parallel to one another between lens 404 and SLM 402. In some embodiments, chief rays 421-1, 421-2, and 421-3 are parallel to an optical axis of lens 404 (e.g., optical axis 402-1). Such configuration is sometimes called a telecentric configuration. Lens 404 is configured to receive and transmit the image light toward waveguides 410-1 and 410-2. In some embodiments, lens 404 is a positive field lens configured to redirect the image light so that chief rays 421-1, 421-2, and 421-3 are non-parallel to each other.

As explained above, chief rays 421-1, 421-2, and 421-3 are directed to a center portion of the aperture, indicated with arrow 411-1. Similarly, marginal rays (e.g., marginal rays 422-1 and 422-2 originating from a common point from SLM 402 as chief ray 421-3) of respective light 420-1, 420-2, and 420-3 are directed to respective portions of waveguide 410-1 (e.g., portions indicated with arrows 411-2 and 411-3) that are distinct from the center of the aperture. In some embodiments, as shown in FIG. 4B, a respective portion of waveguide 410-1 (e.g., as indicated with arrows 411-1, 411-2, and 411-3) receives a combination of light from different portions of SLM 402 (e.g., light 420-1, 420-2, and 420-3).

In configurations in which projection device 400 includes cube 406, light 420-1, 420-2, and 420-3 are transmitted through cube 406, including polarization-selective reflector 408 embedded in cube 406, toward waveguides 410-1 and 410-2 coupled with in-couplers 418-1 and 418-2, respectively. In some embodiments, retarder plate 416 is positioned between cube 406 and waveguides 410-1 and 410-2 to receive light 420-1, 420-2, and 420-3, as shown. Retarder plate 416 transmits light 420-1, 420-2, and 420-3 while converting the polarization of the light from the first linear polarization to a first circular polarization. In some embodiments, projection device 400 further includes a polarizer (e.g., polarizer 417 shown in FIG. 4A). The polarizer is positioned between retarder plate 416 and waveguides 410-1 and 410-2 or between cube 406 and retarder plate 416. In some embodiments, the polarizer transmits only a portion of light 420-1, 420-2, and 420-3 having a particular polarization (e.g., a portion of light 420-1, 420-2, and 420-3 having the first linear polarization or the first circular polarization, depending on its position with respect to retarder plate 416) while a portion of light 420-1, 420-2, and 420-3 having a polarization other than the particular polarization is absorbed by the polarizer). In some embodiments, the polarizer functions as a selective analyzer, as described above with respect to polarization-selective reflector 408 in FIG. 4A. In such embodiments, the image light with the particular polarization (e.g., light 420-1, 4202, and 420-3) renders one or more images based on virtual reality, augmented reality, or mixed reality content to a user.

In-couplers 418-1 and 418-2 are positioned on respective surfaces of waveguides 410-1 and 410-2. For example, in-coupler 418-1 is coupled with side 410-1A of waveguide 410-1, and in-coupler 418-2 is coupled with side 410-2A of waveguide 410-2. In-couplers 418-1 and 418-2 are polarization-selective optical elements. For example, a polarization selective element transmits light having a first polarization (e.g., a first circular polarization or a first linear polarization) and redirects (e.g., reflects or diffracts) light having a second polarization distinct from the first polarization (e.g., a second circular polarization orthogonal to the first circular polarization or a second linear polarization orthogonal to the first linear polarization). In some embodiments, in-couplers 418-1 and 418-2 are polarization-selective elements selected from the group consisting of: a liquid-crystal-based polarization-selective element, a polarization-selective element including a metasurface, a polarization-selective element including a resonant structured surface, a polarization-selective element including a continuous chiral layer, and a polarization-selective element including a birefringent material. For example, a polarization selective element includes a continuous chiral layer, which can selectively redirect circularly polarized light having a particular handedness. As another example, a polarization selective element includes a metasurface or resonant structures, which can selectively redirect either linearly polarized light or circularly polarized light. In some embodiments, in-couplers 418-1 and 418-2 are polarization volume hologram gratings (PVH grating) (e.g., polarization volume gratings 800 described below with respect to FIGS. 8A-8D). A PVH grating (e.g., PVH grating 800) is selective with respect to circular polarization, incident angle, and/or wavelength range of light incident thereon. For example, PVH grating 800 may transmit light having a first circular polarization and diffract light having a circular polarization that is orthogonal to the first circular polarization.

As shown in FIG. 4B, waveguide 410-1 and in-coupler 418-1 are configured to receive the image light (e.g., light 420-1, 420-2, and 420-3). In FIG. 4B, in-couplers 418-1 and 418-2 are configured to transmit light having a first circular polarization while reflecting light having a second circular polarization orthogonal to the first circular polarization. Light 420-1, 420-2, and 420-3 transmitted through polarization-selective reflector 408 has the first linear polarization. The polarization of light 420-1, 420-2, and 420-3 is converted to the first circular polarization while the light is transmitted through retarder plate 416. Light 420-1, 420-2, and 420-3 is thereby transmitted by in-couplers 418-1 and 418-2 toward reflector 412 (e.g., without changing its direction or polarization). Reflector 412 is configured to receive light 420-1, 420-2, and 420-3 and to reflect light 420-1, 420-2, and 420-3 as light having the second circular polarization (e.g., a circular polarization that is orthogonal to the first circular polarization). Reflector 412 having a curved shape is further configured to reduce divergence angle of the reflected light. In-coupler 418-1 receives light 420-1, 420-2, and 420-3 having the second circular polarization from reflector 412 and, instead of transmitting the received light, light 420-1, 420-2, and 420-3 is redirected by in-coupler 418-1. In some other embodiments, in-couplers 418-1 and 418-2 are configured to transmit light having the first linear polarization while reflecting light having the second linear polarization orthogonal to the first linear polarization. In such embodiments, retarder plate 416 is positioned between reflector 412 and in-coupler 418-1. Light 420-1, 420-2, and 420-3 transmitted through polarization-selective reflector 408 has the first linear polarization and is thereby transmitted by in-couplers 418-1 and 418-2 toward reflector 412. While passing through retarder plate 416, the polarization of light 420-1, 420-2, and 420-3 is converted so that light 420-1, 420-2, and 420-3 incident on retarder plate 416 has the first circular polarization. Reflector 412 reflects light 420-1, 420-2, and 420-3 as light having the second circular polarization. Light 420-1, 420-2, and 420-3 is then transmitted through retarder plate 416 which converts the polarization of light 420-1, 420-2, and 420-3 so that light 420-1, 420-2, and 420-3 incident on in-coupler 418-1 has the second linear polarization. In-coupler 418-1 receives light 420-1, 420-2, and 420-3 having the second linear polarization from reflector 412 and, instead of transmitting the received light, light 420-1, 420-2, and 420-3 is redirected by in-coupler 418-1.

In some embodiments, in-coupler 418-1 is a reflective polarization-selective element, and in-coupler 418-1 redirects at least a portion of light 420-1, 420-2, and 420-3 to propagate within waveguide 410-1. For example, in-coupler 418-1 may redirect at least a portion of light 420-1, 420-2, and 420-3 toward side 410-1B of waveguide 410-1 at an incident angle that is above a critical angle associated with waveguide 410-1. The critical angle refers to an angle of incidence above which light passing through a denser medium (e.g., waveguide 410-1) toward an interface with a less dense medium (e.g., air outside waveguide 410-1) is totally reflected (e.g., the critical angle is an angle of incidence above which total internal reflection occurs). Propagation of the image light through waveguide 410-1 is further described with respect to FIG. 4C. In some embodiments, in-coupler 418-1 is a transmissive polarization-selective element coupled with side 410-1B of waveguide 410-1 (e.g., the transmissive polarization-selective element redirects at least a portion of light 420-1, 420-2, and 420-3 toward side 410-1A of waveguide 410-1 at an incident angle that is equal to or greater than the critical angle associated with waveguide 410-1 so that the redirected light propagates within waveguide 410-1 via total internal reflection).

Projection device 400 described with respect to FIGS. 4A and 4B provides for a compact sized projection system that directs light from SLM 402 to the one or more waveguides (e.g., waveguides 410-1 and 410-2). A combination of a curved reflector (e.g., reflector 412) and a positive field lens (e.g., lens 404) provides a catadioptric system (e.g., a system involving reflection and refraction of light) that allows chief rays (e.g., chief rays 421-1, 421-2, and 421-3) to be non-parallel between lens 404 and waveguides 410-1 and 410-2 while the chief rays are parallel between lens 404 and SLM 402. Such configuration allows the use of a smaller (or narrower) cube 406 compared to a configuration having parallel chief rays between SLM 402 and waveguides 410-1 and 410-2. The size of such cube 406 is characterized by a reduced width W1 indicated in FIG. 4B. In some embodiments, reduced width W1 also allows reduction of other dimensions (e.g., height in a direction parallel to optical axis 402-1) because an overall space required by polarization-selective reflector 408 is reduced.

Figure 4C:
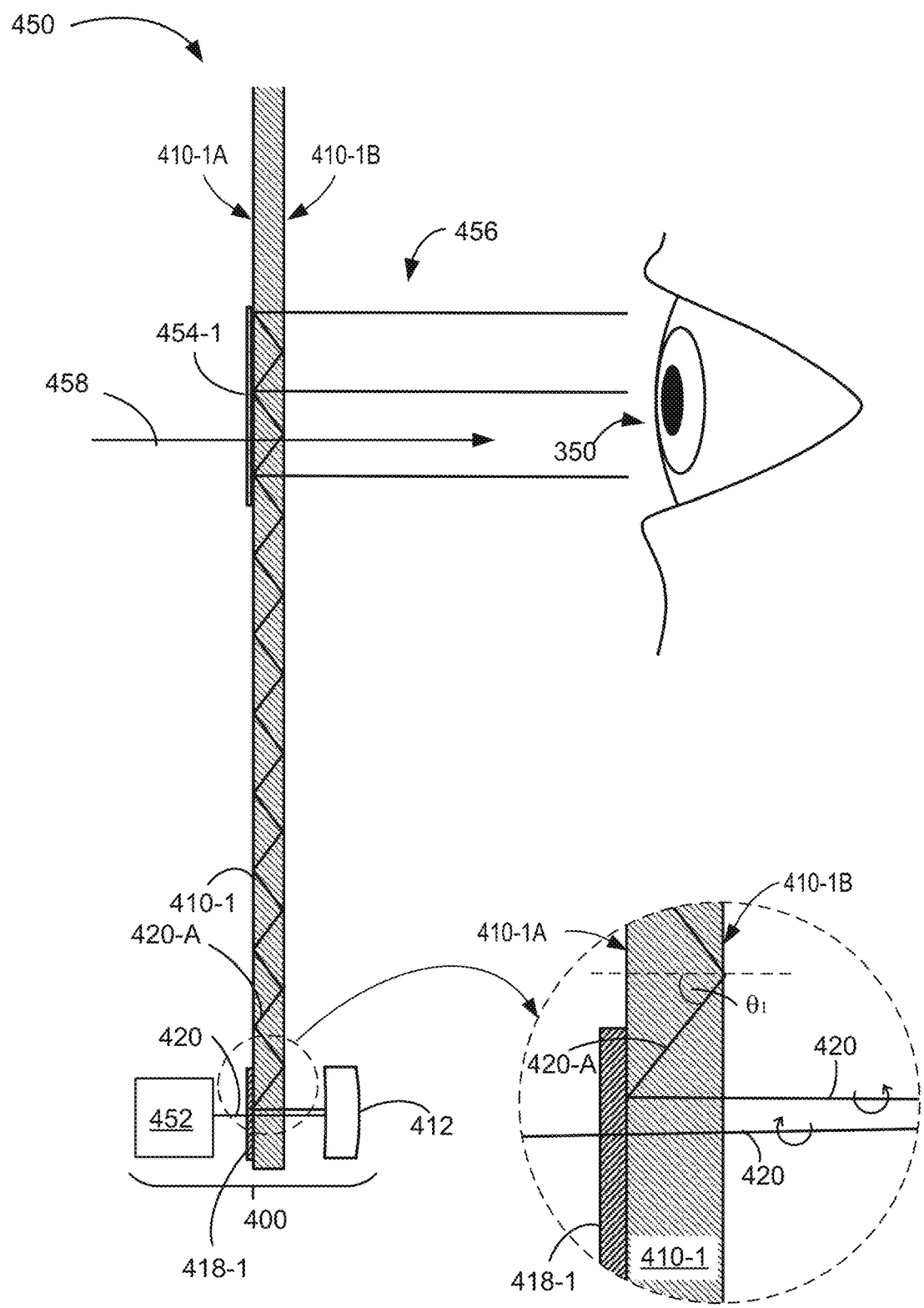
FIG. 4C is a schematic diagram illustrating a display device in accordance with some embodiments.

FIG. 4C is a schematic diagram illustrating display device 450 in accordance with some embodiments. Display device 450 includes projection device 400 described with respect to FIGS. 4A and 4B. Projection device 400 includes reflector 412, waveguide 410-1, in-coupler 418-1, and optical components 452 (illustrated as a box) that include SLM 402, lens 404, polarization-selective reflector 408, cube 406, and retarder plate 416 shown in FIG. 4A. Optical components 452 further include an illumination device (e.g., illumination devices described below with respect to FIGS. 6A-7B). In-coupler 418-1 and at least a portion of waveguide 410-1 are disposed between optical components 452 and reflector 412. In-coupler 418-1 is configured to receive and transmit light 420 having the first circular polarization from optical components 452. In-coupler 418-1 is further configured to receive light 420 reflected off reflector 412 having the second circular polarization and redirecting (e.g., reflecting or diffracting) at least a portion of light 420 (e.g., light 420-A). Due to the redirection by in-coupler 418-1, light 420-A impinges on side 410-1B of waveguide 410-1 at an incident angle $\theta_1$ that is equal to or greater than the critical angle associated with the waveguide 410-1, as shown in the inset of FIG. 4C. Light 420-A thereby undergoes total internal reflection inside waveguide 410-1 and propagates within the waveguide via repeated occurrences of total internal reflection, as shown by the zig-zagging path of light 420-A as shown in FIG. 4C.

Display device 450 further includes one or more output couplers 454-1 coupled with waveguide 410-1. One or more output couplers 454-1 are positioned at a distance from in-coupler 418-1. In some embodiments, the one or more output couplers 454-1 are positioned on side 410-1A of waveguide 410-1, as shown in FIG. 4C. In some embodiments, the one or more output couplers 454-1 are positioned on side 410-1B of waveguide 410-1. One or more output couplers 454-1 are configured to redirect at least a portion of light 420-A (e.g., light 456) out of waveguide 410-1 toward pupil 350 of the user. In some embodiments, one or more output couplers 454-1 include one or more surface relief gratings. In some embodiments, one or more output couplers 454-1 include one or more reflectors, one or more reflective polarizers, one or more gratings, one or more tunable liquid crystal components, and/or one or more polarization volume gratings. In some embodiments, one or more output couplers 454-1 are configured to redirect light 420-A to pupil 350 while also expanding, in conjunction with waveguide 410-1, etendue of the light 420-A in display device 450. Etendue refers to a property of light in an optical system characterizing how "spread out" the light is in terms of an area and an angle. An original input pupil area of light 420 is increased by replication as light 420 goes through multiple interactions with the one or more output couplers 454-1.

In some embodiments, waveguide 410-1 is configured as an optical combiner to transmit light from outside display device 450 (e.g., ambient light, such as light 458). Image light 456 output from waveguide 410-1 is combined, or overlapped, with light 458 from the outside of display device 450 to form a combined image in the user's eye (e.g., pupil 350). As a result, the user's perception of surrounding environment is augmented by one or more images output by SLM 402.

In some embodiments, display device 450 is a clip-on display. A clip-on display is configured to be coupled (e.g., clipped on) to a frame of a headset (e.g., a frame of goggles) for displaying visual contents. The clip-on display is further configured to be un-coupled from the frame of the headset. Various configurations of clip-on displays are described in U.S. patent application Ser. No. 16/436,729 filed Jun. 10, 2019, entitled "Optical Assemblies Having Polarization Volume Gratings for Projecting Augmented Reality Content," which is incorporated by reference herein in its entirety.

Figure 4D:
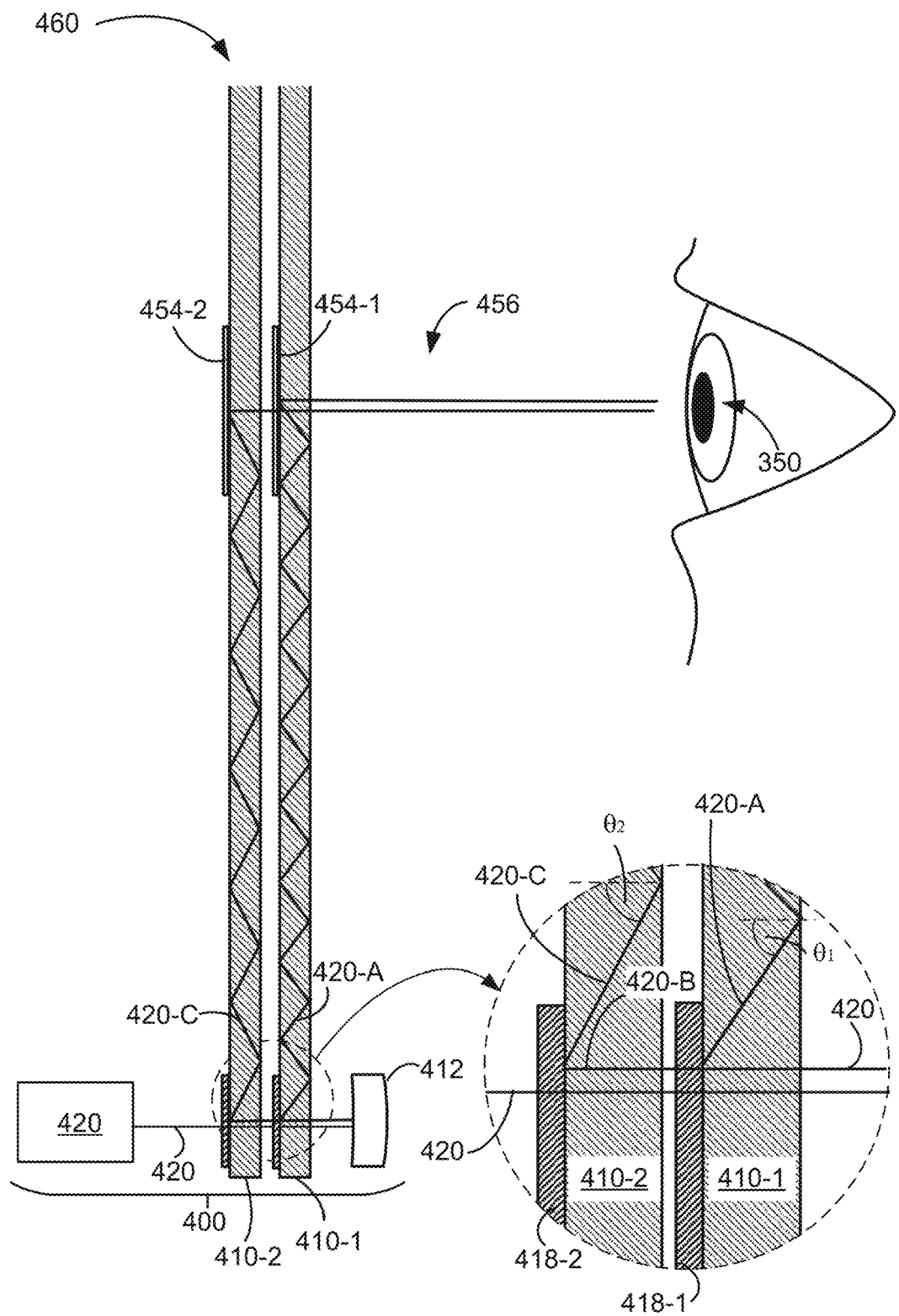
FIG. 4D is a schematic diagram illustrating a display device in accordance with some embodiments.

FIG. 4D is a schematic diagram illustrating display device 460 in accordance with some embodiments. Display device 460 is similar to display device 450 described above with respect to FIG. 4C, except that projection device 400 in display device 460 further includes waveguide 410-2 and in-coupler 418-2 coupled with waveguide 410-2. In some embodiments, waveguide 410-2 is positioned parallel to waveguide 410-1, as shown in FIG. 4D. In-coupler 418-2 and at least a portion of waveguide 410-2 are disposed between optical components 452 and reflector 412.

As shown in FIG. 4D, in addition to being polarization selective, in-coupler 418-1 is also wavelength selective. In some embodiments, a first portion of light 420, e.g., light 420-A redirected by in-coupler 418-1 is in a first wavelength range. Thus, in-coupler 418-1 is further configured to transmit a second portion of light 420 (e.g., light 420-B) having a second wavelength range distinct from the first wavelength range while redirecting light 420-A. In-coupler 418-2 is configured to, similar to in-coupler 418-1, to receive and transmit light 420 having the first polarization. In-coupler 418-2 is further configured to receive light 420-B having the second polarization and the second wavelength range, and to redirect at least a portion of light 420-B (e.g., light 420-C), so that light 420-C impinges on a surface of waveguide 410-2 at an incident angle $\theta_2$ that is above a critical angle associated with waveguide 410-2. Thus, light 420-C would undergo total internal reflection inside second waveguide 410-2 and continue to propagate through the waveguide via a series of total reflection events. In some embodiments, the incident angle $\theta_2$ is identical to the incident angle $\theta_1$. In some embodiments, the incident angle $\theta_2$ is distinct from the incident angle $\theta_1$. One or more output couplers 454-2 are configured to redirect at least a portion of light 420-C (e.g., light 456) out of the waveguide 410-2 toward pupil 350 of the user.

In some embodiments, the first wavelength range and the second wavelength range correspond to distinct colors or distinct ranges of colors. For example, the first wavelength range corresponds to red light (e.g., the first wavelength range is from 635 nm through 700 nm corresponding to red color) and the second wavelength range corresponds to green light (e.g., the first wavelength range is from 520 nm through 560 nm corresponding to green color). In some embodiments, the first wavelength range corresponds to a first portion of a first color and a first portion of a second color and the second wavelength range corresponds to a second portion of the first color and a second portion of the second color. For example, the first wavelength range corresponds to a first portion of red light and a first portion of green light (e.g., the first wavelength range is from 635 nm through 650 nm and from 520 nm through 540 nm) and the second wavelength range corresponds to a second portion of red light and a second portion of green (e.g., the first wavelength range is from 650 nm through 700 nm and from 540 nm through 560 nm). In some embodiments, the wavelength ranges are a combination of three colors, such as red, green and blue (e.g., a blue color ranging from 450 nm through 490 nm) or more.

Figure 5A:
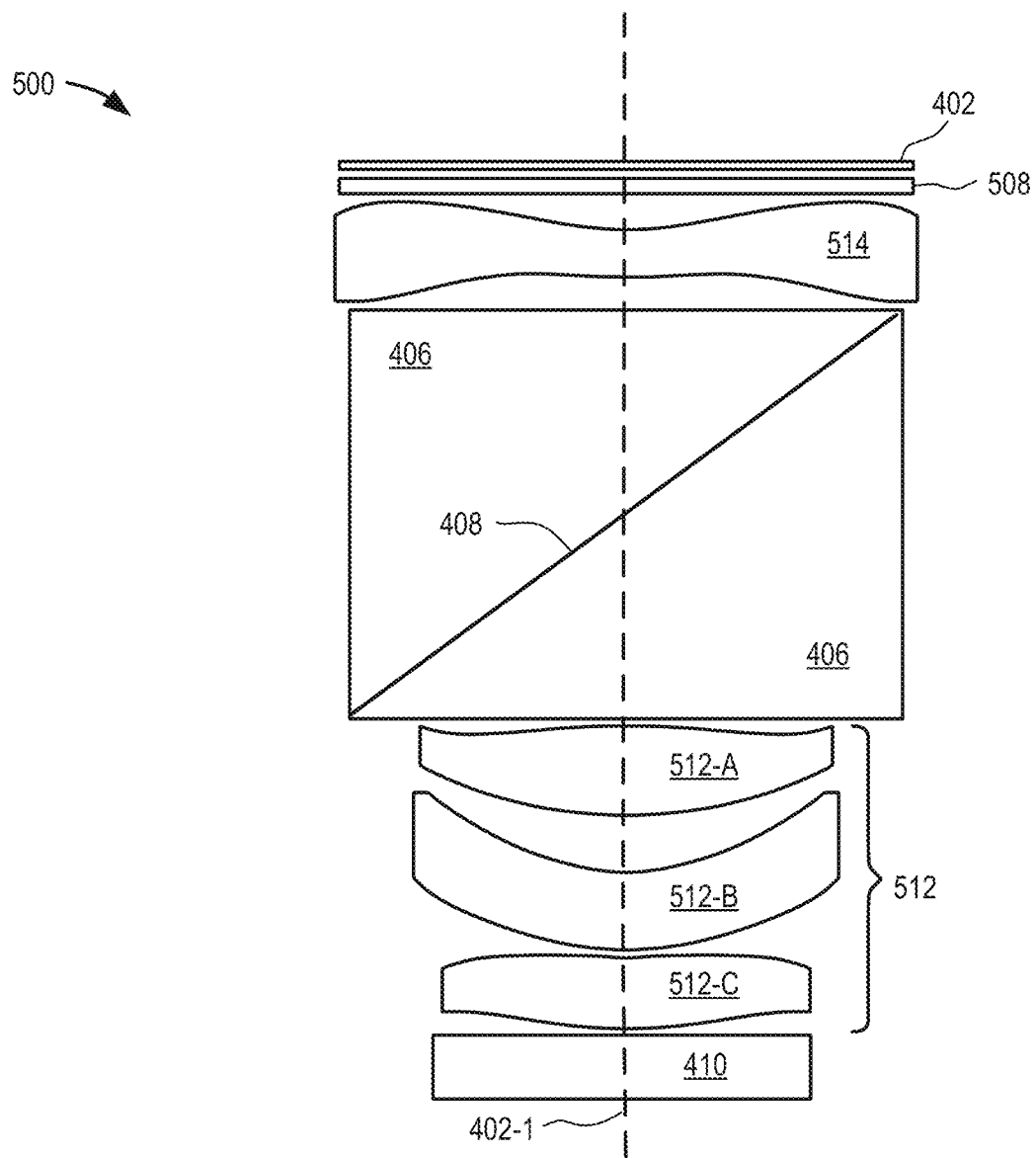
FIGS. 5A and 5B are schematic diagrams illustrating a projection device for outputting image light in accordance with some embodiments.
Figure 5B:
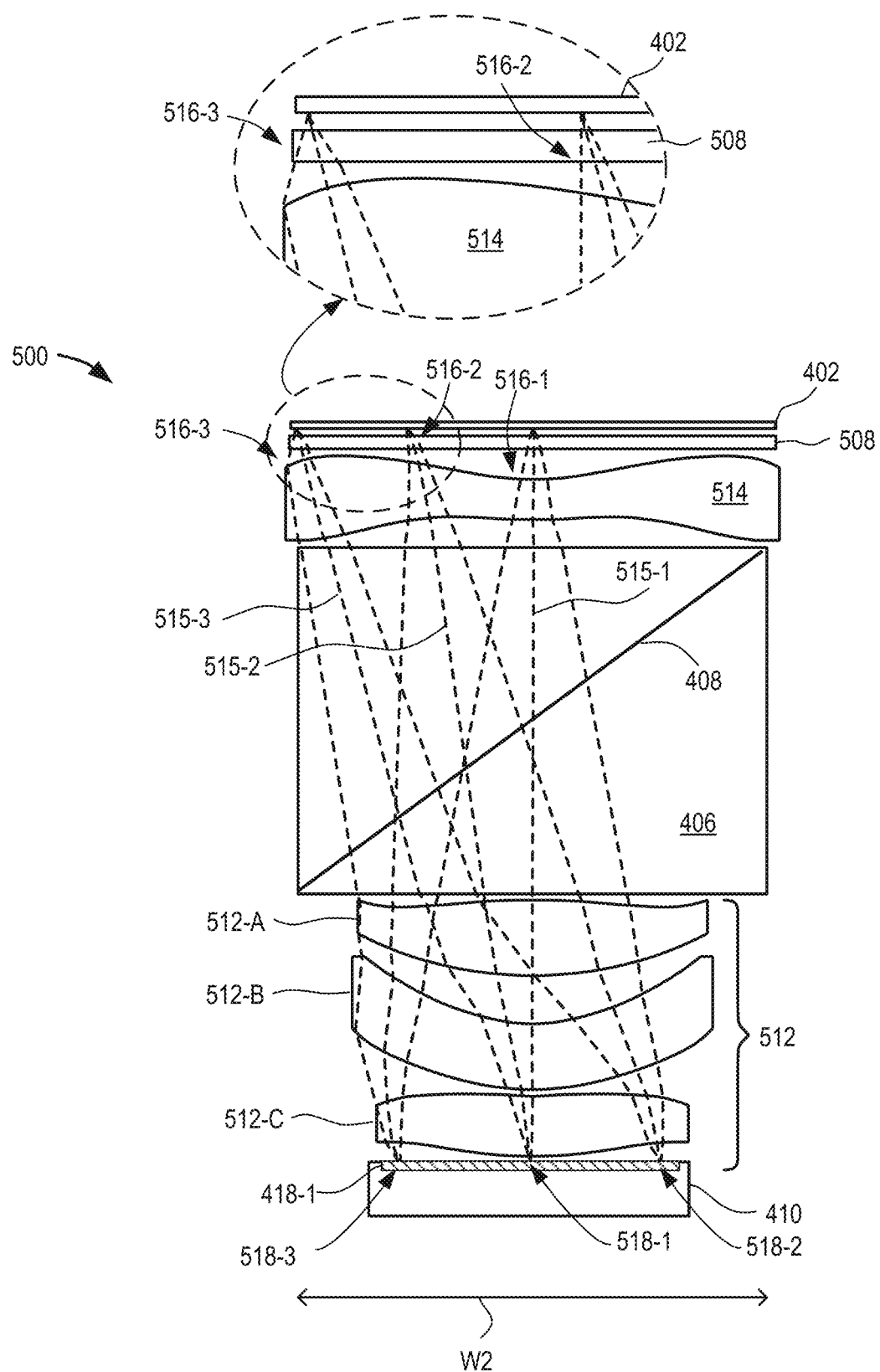

FIGS. 5A and 5B are schematic diagrams illustrating projection device 500 for outputting image light in accordance with some embodiments. Optical device includes SLM 402, polarization-selective reflector 408 (which may be embedded diagonally inside cube 406), and waveguide 410, as described with respect to FIGS. 4A and 4B. Polarization-selective reflector 408 is positioned in an orientation that is non-perpendicular to optical axis 402-1 of SLM 402. Optical device further includes diffractive lens 508 positioned between polarization-selective reflector 408 and SLM 402. In some embodiments, diffractive lens 508 is an axisymmetric lens. In some embodiments, projection device 500 further includes one or more lenses. As shown in FIG. 4A, projection device 500 includes lens 514 which is a negative field lens positioned between diffractive lens 508 and polarization-selective reflector 408. In FIG. 4A, projection device 500 further includes lens set 512 including lenses 512-A, 512-B, and 512-C positioned between waveguide 410 and polarization-selective reflector 408. In some embodiments, SLM 402, diffractive lens 508, lens set 512 and/or waveguide 410 are positioned so that they have a substantially common optical axis (e.g., corresponding to optical axis 402-1 of SLM 402).

As shown in FIG. 5B, SLM 402 is configured to project image light (e.g., light 516-1, 516-2, and 516-3) from respective locations of SLM 402. The image light projected by SLM 402 includes chief rays (e.g., chief rays 515-1, 515-2, and 515-3 of respective light 516-1, 516-2, and 516-3). Chief rays 515-1, 515-2, and 515-3 are parallel to one another between diffractive lens 508 and SLM 402. In some embodiments, chief rays 515-1, 515-2, and 515-3 are parallel to an optical axis of diffractive lens 508 (e.g., optical axis 402-1 shown in FIG. 5A), in a configuration called as telecentric configuration. Diffractive lens 508 is configured to receive and transmit the image light toward waveguide 410. In some embodiments, diffractive lens 508 is configured to redirect the image light so that chief rays 515-1, 515-2, and 515-3 are non-parallel to each other between diffractive lens 508 and waveguide 410 (e.g., in a configuration that is non-telecentric). As shown, chief rays 515-1, 515-2, and 515-3 are redirected toward a common focal point (e.g., point 518-1 on waveguide 410, which may corresponds to a center of an in-coupler 418-1).

Light 516-1, 516-2, and 516-3 is transmitted through polarization-selective reflector 408 and lens set 512 toward waveguide 410. In some embodiments, a retarder plate (e.g., retarder plate 416 shown in FIG. 4A) is positioned between cube 406 and waveguide 410 for converting polarization of light 516-1, 516-2, and 516-3 from linear to circular polarization, and vice versa. In some embodiments, a polarizer (e.g., polarizer 417 shown in FIG. 4A) is positioned between cube 406 and waveguide 410 to receive light 516-1, 516-2, and 516-3 and transmits only a portion of light 516-1, 516-2, and 516-3 having a particular polarization (e.g., a portion of light 516-1, 516-2, and 516-3 light having the particular circular or linear polarization while a portion of light 516-1, 516-2, and 516-3 having a polarization other than the particular polarization is absorbed by the polarizer).

Figure 5C:
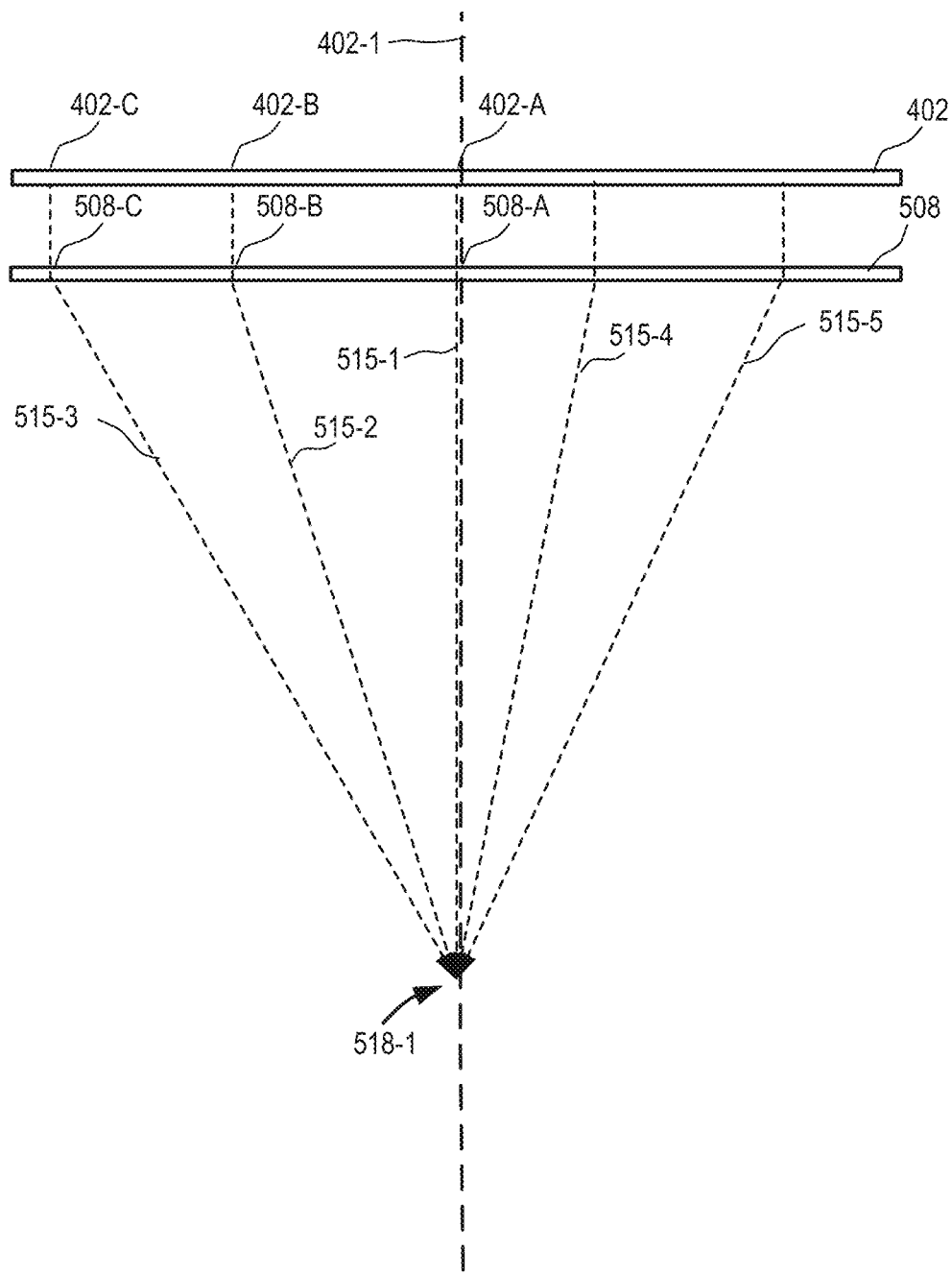
FIG. 5C is a schematic diagram illustrating a diffractive lens optically coupled with a spatial light modulator in accordance with some embodiments.

FIG. 5C is a schematic diagram illustrating diffractive lens 508 optically coupled with spatial light modulator 402 in accordance with some embodiments. As shown, chief ray 515-1 is output from location 402-A of SLM 402 and impinges on diffractive lens 508 at location 508-A, chief ray 515-2 is output from location 402-B of SLM 402 and impinges on diffractive lens 508 at location 508-A, and chief ray 515-3 is output from location 402-C of SLM 402 and impinges on diffractive lens 508 at location 508-C. In FIG. 5C, locations 402-A and 508-A are at a first distance (e.g., a distance that is substantially zero), locations 402-B and 508-B are at a second distance, and locations 402-C and 508-C are at a third distance from optical axis 402-1 of SLM 402 and diffractive lens 508. Diffractive lens 508 reshapes the chief rays 515-1, 515-2, 515-3, 515-4, and 515-5 so that the optical system 500 operates as a telecentric system. As shown, chief rays 515-1, 515-2, 515-3, 515-4, and 515-5 are parallel to one another between diffractive lens 508 and SLM 402. Chief rays 515-1, 515-2, 515-3, 515-4, and 515-5 are also parallel to optical axis 402-1, which is a common optical axis of diffractive lens 508 and SLM 402, between diffractive lens 508 and SLM 402. In some embodiments, diffractive lens 508 redirects chief rays 515-1, 515-2, 515-3, 515-4, and 515-5 toward a common focal point. However, in some other embodiments, diffractive lens 508 may also redirect chief rays 515-1, 515-2, 515-3, 515-4, and 515-5 toward distinct focal points.

Projection device 500 described with respect to FIGS. 5A-5C provides for a compact sized projection system that directs light from SLM 402 to the one or more waveguides (e.g., waveguide 410). Diffractive lens 508 in combination with negative field lens 514 enables a telecentric optical system that allows chief light rays to be non-parallel between refractive lens 514 and waveguide 410 while the chief rays are parallel between diffractive lens 508 and SLM 402. Such configuration has a reduced width W2 shown in FIG. 5B defined by polarization-selective reflector 408 embedded inside cube 406 and optics (e.g., lens 514 and lens set 512) compared to a configuration having parallel chief rays between refractive lens 514 and waveguide 410 (e.g., a configuration having parallel chief rays between refractive lens 514 and waveguide 410 may require optics having a width or diameter that is equal to or greater than a width of SLM 402 whereas projection device 500 may use optics having a width or diameter that is less than the width of SLM 402). In some embodiments, reduced width W2 also allows reduction of other dimensions (e.g., height in a direction parallel to optical axis 402-1) because an overall space required by polarization-selective reflector 408 is reduced.

Figure 6A:
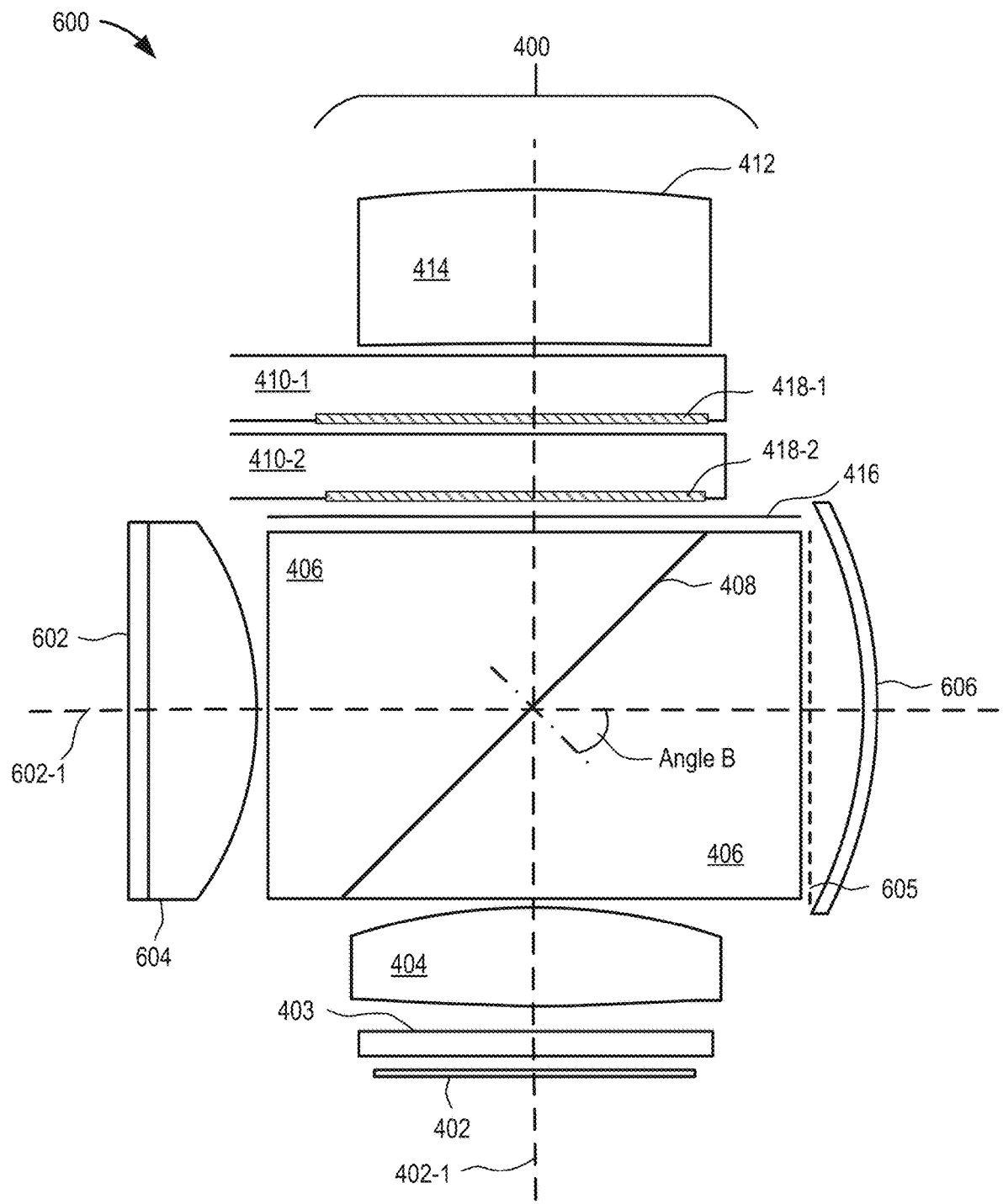
FIGS. 6A-6C are schematic diagrams illustrating an illumination device for illuminating the projection device of FIG. 4A in accordance with some embodiments.
Figure 6B:
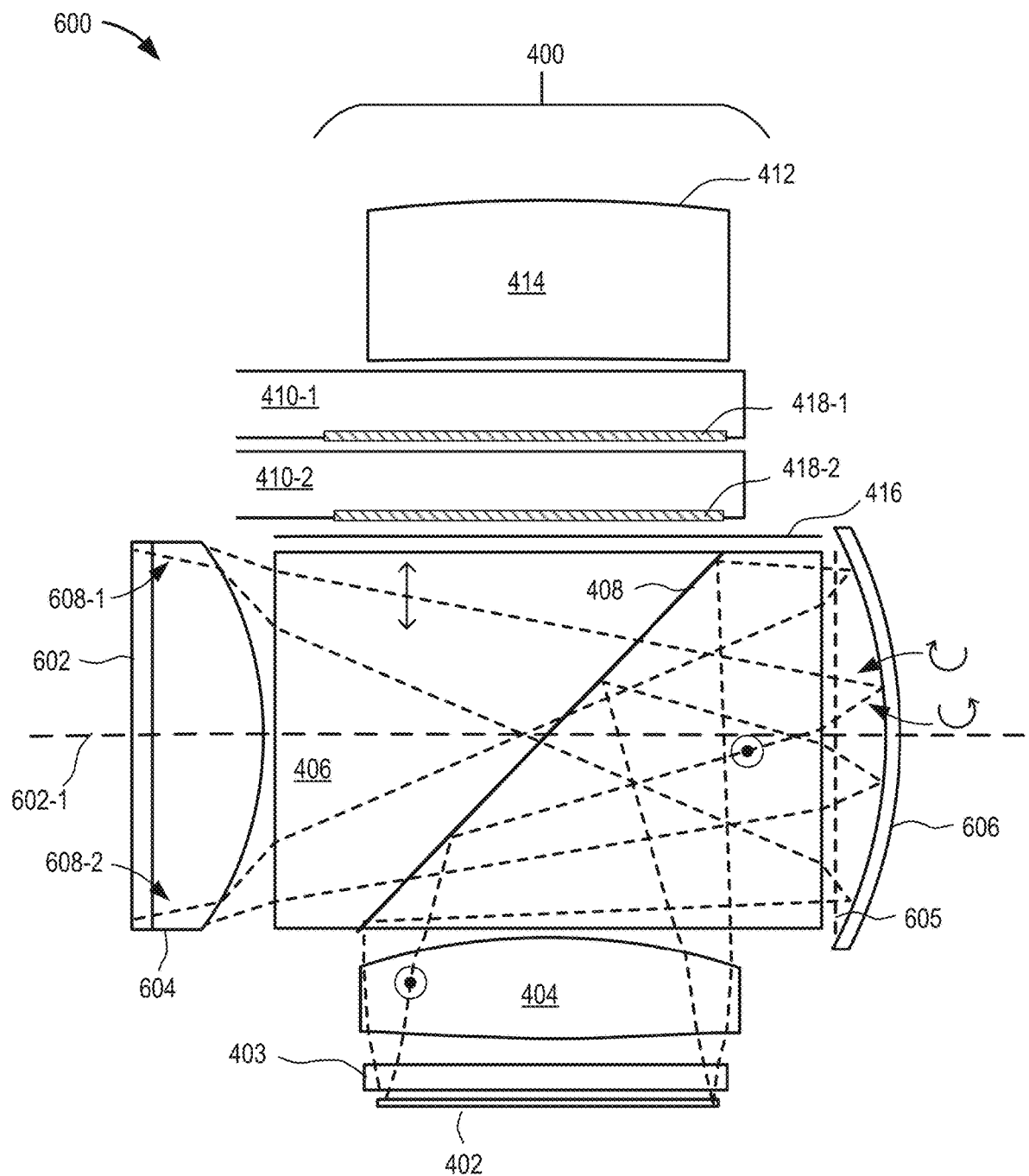
Figure 6C:
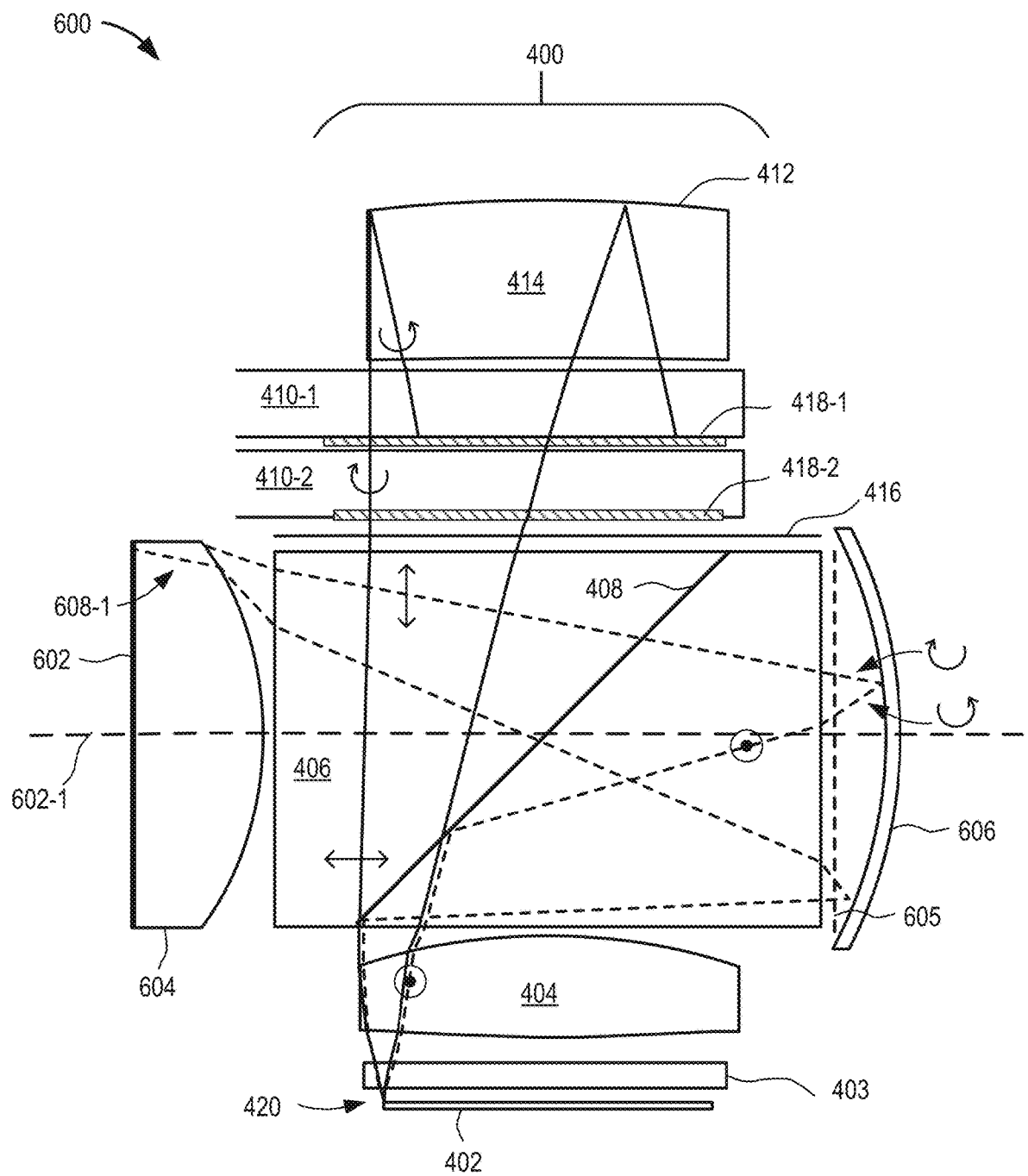

FIGS. 6A-6C are schematic diagrams illustrating illumination device 600 for illuminating projection device 400 in accordance with some embodiments. In FIG. 6A, illumination device 600 is optically coupled with projection device 400 (e.g., illumination device 600 includes, or is integrated with, projection device 400). However, in some embodiments, illumination device 600 is optically coupled with projection device 500 (e.g., illumination device 600 may include, or be integrated with, projection device 500 instead of projection device 400) in an analogous manner. Illumination device 600 includes illumination source 602, reflector 606, and optionally retarder plate 605. In some embodiments, illumination device 600 further includes one or more lenses, such as lens 604 optically coupled with illumination source 602. In some embodiments, illumination device 600 does not require a lens optically coupled with illumination source 602. In some embodiments, illumination source 602 includes an array of light emitting devices, such as an array of light emitting diodes (LEDs), an array of miniLEDs, an array of superluminescent LEDs (sLEDs), an array of laser diodes, or any combination thereof. Illumination source 602 defines optical axis 602-1 that is non-parallel to polarization-selective reflector 408. In some embodiments, polarization-selective reflector 408 defines an angle (e.g., angle B) ranging from 30 degrees to 60 degrees with optical axis 602-1 of illumination source 602. For example, angle B ranges from 30 to 60 degrees, 40 to 50 degrees, 30 to 40 degrees, 40 to 50 degrees, or 50 to 60 degrees. In some embodiments, angle B is 45 degrees.

In some embodiments, reflector 606 is a curved reflector. In some embodiments, reflector 606 is a catadioptric lens (e.g., a lens involving reflection and refraction of light), like reflector 412 coupled with lens 414 as shown in FIG. 6A. In some embodiments, reflector 606 is integrated with cube 406 (e.g., by cementing or integral formation). In FIG. 6A, reflector 606 is positioned on an opposing side of polarization-selective reflector 408 than illumination source 602. In some embodiments, reflector 606, illumination source 602, and lens 604 have a common optical axis (e.g., optical axis 602-1). However, illumination device 600 and projection device 400 may be arranged in different configurations so that SLM 402, illumination source 602, reflector 606, and waveguides 410-1 and 410-2 are positioned on different sides of cube 406 than shown in FIG. 6A (e.g., light source 602 and reflector 606 may be positioned on adjacent sides of cube 406, SLM 402 and reflector 606 may be positioned on opposite sides of cube 406, and waveguides 410-1 and 410-2 may be positioned on an opposite side from light source 602).

As shown in FIG. 6B, illumination source 602 projects illumination light (e.g., light 608-1 and 608-2) having a first linear polarization. The illumination light is transmitted through polarization-selective reflector 408 and retarder plate 605 (e.g., a quarter-wave plate) toward reflector 606. Retarder plate 605 converts polarization of light 608-1 and 608-2 from the first linear polarization to a first circular polarization. Reflector 606 receives the illumination light and redirects the illumination light back toward polarization-selective reflector 408 through retarder plate 605. The redirected illumination light has a second circular polarization different from (e.g., orthogonal to) the first circular polarization. Retarder plate 605 then converts the second circular polarization to a second linear polarization orthogonal to the first linear polarization. Polarization-selective reflector 408 receives the illumination light having the second linear polarization and reflects the illumination light toward SLM 402. The polarization of the illumination light is maintained upon reflection so that the illumination light impinging on SLM 402 has the second linear polarization.

As shown in FIG. 6C, SLM 402 receives the illumination light (e.g., light 608-1). SLM 402 is configured to modulate a phase or intensity of at least a portion of the illumination light to project image light (e.g., light 420-1) as described above with respect to FIG. 4B. In some embodiments, the image light projected from the SLM 402 includes a combination of the first polarization and the second polarization. A portion of the image light having the first linear polarization is transmitted through polarization-selective reflector 408 while a portion of the image light having the second linear polarization is reflected. The portion of the image light 420 having the first linear polarization is configured to render one or more images. The portion of the image light 420 having the first linear polarization is transmitted through retarder plate 416, in-couplers 418-1 and 418-2 and waveguides 410-1 and 410-2 toward reflector 412, which reflects the image light back toward in-couplers 418-1 and 418-2 for coupling into waveguide 410-1 and/or waveguide 410-2 for propagation within respective waveguides.

Figure 6D:
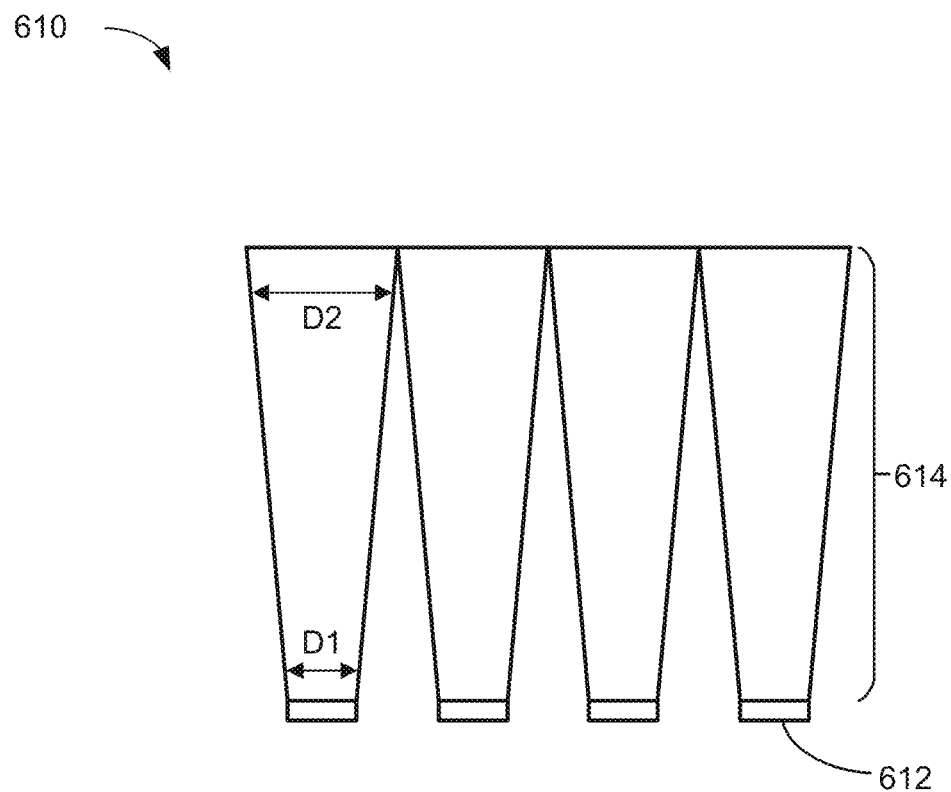
FIG. 6D is a schematic diagram illustrating an array of tapered integrators in accordance with some embodiments.

FIG. 6D is a schematic diagram illustrating array 610 of tapered integrators in accordance with some embodiments. Array 610 of tapered integrators includes a plurality of integrators 614 positioned adjacent to one another. An input end of a respective integrator 614 has width D1 and an output end of the respective integrator has width D2, which is greater than D1. Array 610 of tapered integrators is configured to be optically coupled with an illumination source, such as illumination source 602 described above with respect to FIG. 6A (e.g., array 610 of tapered integrators may be positioned between light source 602 and cube 406). In some embodiments, illumination source 602 includes an array of light emitting devices 612. In some embodiments, light emitting devices 612 are LEDs or miniLEDs. In some embodiments, each light emitting device 612 of illumination source 602 is optically coupled with a respective tapered integrator 614 of array 610 of tapered integrators. In some embodiments, array 610 of tapered integrators is configured to redirect illumination light output by light emitting devices 612 such that the light output by array 610 of tapered integrators has a smaller diverging angle than light output by light emitting devices 612 (and received by array 610 of tapered integrators).

Figure 7A:
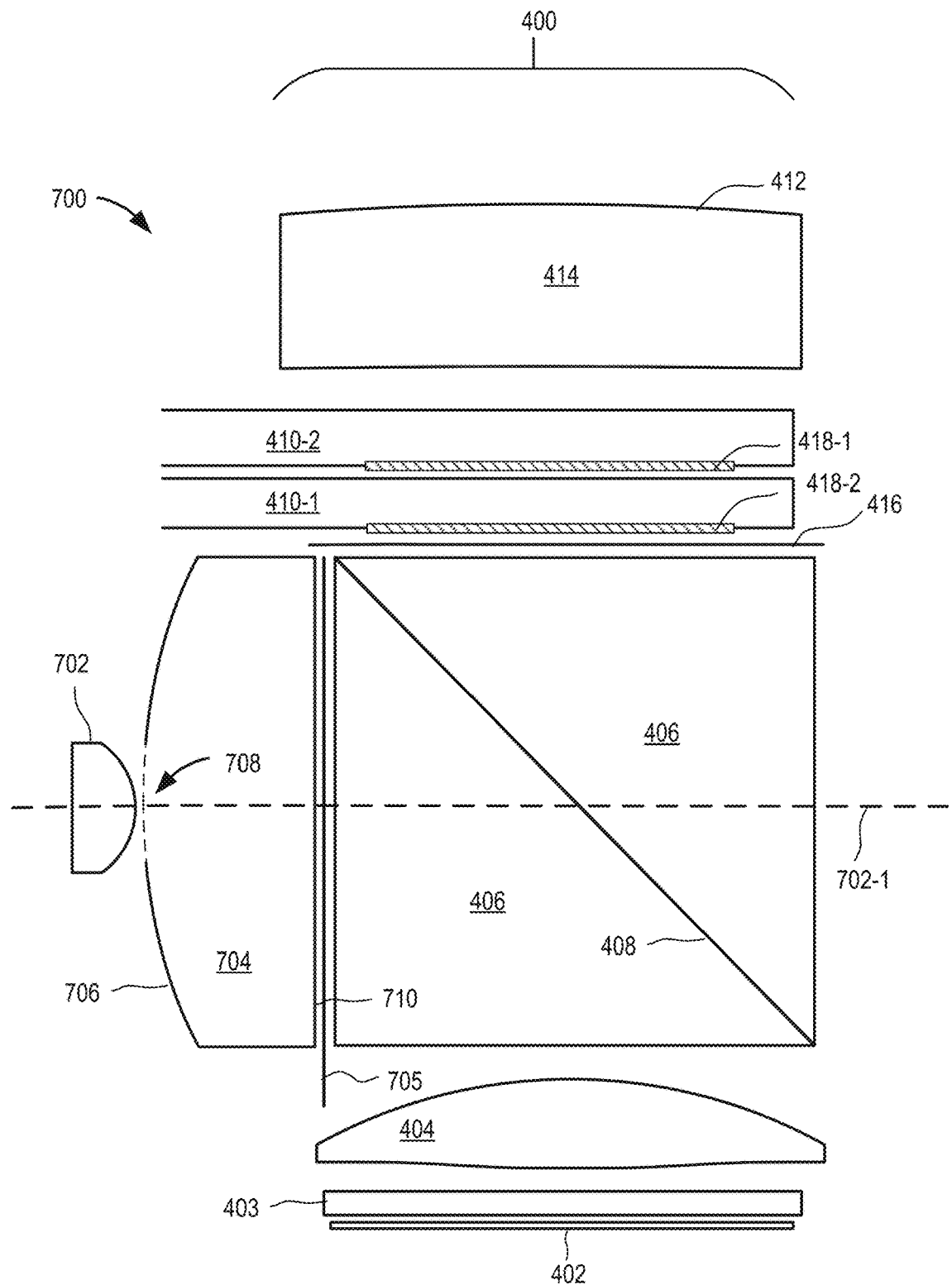
FIGS. 7A-7B are schematic diagrams illustrating an illumination device for illuminating the projection device of FIG. 4A in accordance with some embodiments.
Figure 7B:
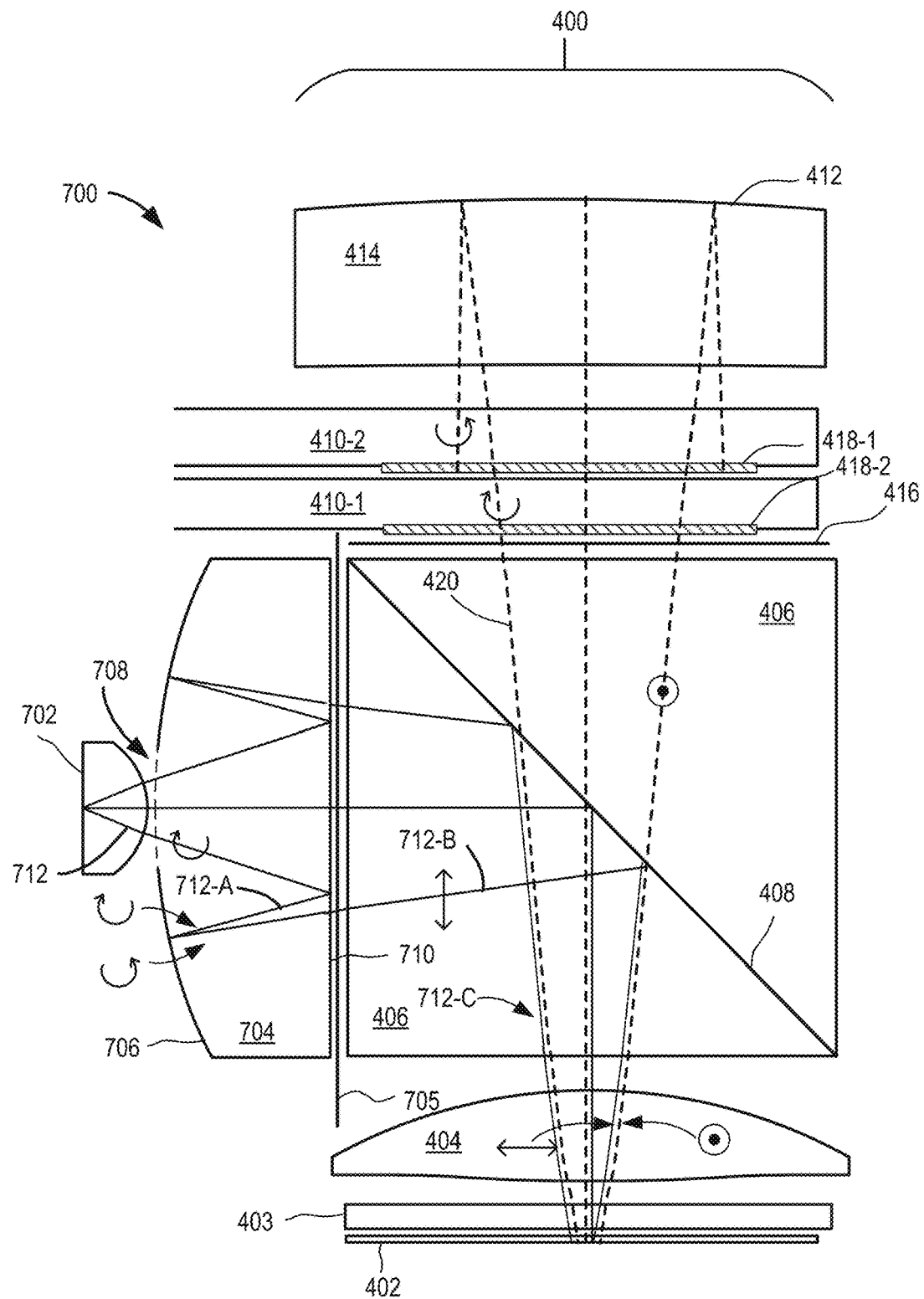

FIGS. 7A-7B are schematic diagrams illustrating illumination device 700 for illuminating projection device 400 in accordance with some embodiments. In FIGS. 7A and 7B, illumination device 700 is optically coupled with projection device 400 (e.g., illumination device 700 includes, or is integrated with, projection device 400). However, illumination device 700 may be optically coupled with projection device 500 (e.g., illumination device 700 may include, be integrated with, projection device 500) in an analogous manner. In FIG. 7A, illumination device 700 includes illumination source 702, reflective polarizer 710 (e.g., a reflective PVH grating described with respect to FIGS. 8A-8D), retarder plate 705 (e.g., a quarter-wave plate), and reflective surface 706 with aperture 708. In some embodiments, reflective polarizer 710 and reflective surface 706 with aperture 708 are positioned on opposing sides of optical element 704, such as a lens, as shown in FIG. 7A. In some embodiments, aperture 708 is a transmissive area surrounded by reflective surface 706 (e.g., a peripheral area of optical element 704 is coated with a reflective material to form reflective surface 706 and define a central area of optical element 704 without the reflective material, where the central area operates as an aperture). In some embodiments, the transmissive area defining aperture 708 is coated with a material (e.g., a material for an antireflection coating) different from the reflective material forming reflective surface 706. In some embodiments, aperture 708 is a physical hole defined in reflective surface 706. In some embodiments, aperture 708 and reflective surface 706 are centered such that they have a common geometric center point.

In some embodiments, illumination source 702 corresponds to illumination source 602 described with respect to FIG. 6A. Similar to illumination source 602 shown in FIG. 6A, illumination source 702 defines an optical axis (e.g., optical axis 702-1) and polarization-selective reflector 408 is positioned non-perpendicularly to the optical axis of illumination source 702. Reflective polarizer 710 is configured to reflect a particular polarization of light while transmitting light having a polarization distinct from (e.g., orthogonal to) the particular polarization. In some embodiments, reflective surface 706 has a curved shape. In some embodiments, illumination source 702 and reflective surface 706 are positioned so that they have a common optical axis (e.g., optical axis 702-1).

In FIG. 7B, illumination source 702 projects illumination light 712 having a first circular polarization through aperture 708 toward reflective polarizer 710. Reflective polarizer 710 (e.g., a reflective PVH grating described with respect to FIGS. 8A-8D) is configured to reflect light having the first circular polarization without changing its polarization (e.g., reflection of light having a right circular polarization has the same right circular polarization) and to transmit light having a second circular polarization different from (e.g., orthogonal to) the first circular polarization. Reflective polarizer 710 receives illumination light 712 and reflects at least a first portion of the illumination light (e.g., light 712-A) toward reflective surface 706. Light 712-A is reflected off reflective surface 706 as light 712-B and the polarization of light 712-B is orthogonal to the polarization of light 712-A (e.g., light 712-B has the second circular polarization). Reflective polarizer 710 transmits at least portion of light 712-B having the second circular polarization toward polarization-selective reflector 408. In FIG. 7B, light 712-B is transmitted through retarder plate 705 which converts the polarization of light 712-B from the second circular polarization to a first linear polarization. In some embodiments, a linear polarizer (e.g., a cleanup polarizer, such as polarizer 417) is placed between retarder plate 705 and polarization-selective reflector 408. Light 712-B having the first linear polarization is reflected by polarization-selective reflector 408 toward SLM 402 as light 712-C. Alternatively, retarder plate 705 is omitted and light 712-B having the second circular polarization is reflected by polarization-selective reflector 408 toward SLM 402.

As shown in FIG. 7B, SLM 402 receives the illumination light (e.g., light 712-C). SLM 402 is configured to modulate at least one of: a phase or an intensity of at least a portion of the illumination light to project image light (e.g., light 420) as described above with respect to FIG. 4B. In some embodiments, the image light projected from the SLM 402 includes a combination of the first linear polarization and the second linear polarization. A portion of the image light having the first linear polarization is transmitted through polarization-selective reflector 408 while a portion of the image light having the second linear polarization is reflected. The portion of the image light 420 having the first linear polarization is configured to render one or more images. The portion of the image light 420 having the first linear polarization is transmitted through retarder plate 416, and in-couplers 418-1 and 418-2 coupled with respective waveguides 410-1 and 410-2 toward reflector 412 which reflects the image light back toward the in-couplers to be redirected to propagate inside waveguide 410-1 and/or waveguide 410-2.

FIGS. 8A-8D are schematic diagrams illustrating polarization volume hologram (PVH) grating 800 in accordance with some embodiments. In some embodiments, at least one of in-couplers 418-1 and 418-2 described with respect to FIG. 4A includes PVH grating 800.

FIG. 8A illustrates a three dimensional view of PVH grating 800 with incoming light 804 entering the grating along the z-axis. FIG. 8B illustrates an x-y-plane view of PVH grating 800 with a plurality of liquid crystals (e.g., liquid crystals 802-1 and 802-2) with various orientations. The orientations of the liquid crystals are constant along reference line AA' along the x-axis, as shown in FIG. 8D illustrating a detailed plane view of the liquid crystals along the reference line. The orientations of the liquid crystals in FIG. 8B vary along the z-axis. The pitch defined as a distance along the z-axis at which the azimuth angle of a liquid crystal has rotated 180 degrees is constant throughout the grating. FIG. 8C illustrates a y-z-cross-sectional view of PVH grating 800. PVH grating 800 has helical structures 808 with helical axes aligned corresponding to the z-axis. In some embodiments, helical structures 808 have helical axes tilted with respect to the z-axis. Helical structures 808 create a volume grating with a plurality of diffraction planes (e.g., diffraction planes 810-1 and 810-2) extending across the grating. In FIG. 8C, diffraction planes 810-1 and 810-2 are tilted with respect to the z-axis. Helical structures 808 define the polarization selectivity of PVH grating 800, as light with circular polarization handedness corresponding to the helical axes is diffracted while light with circular polarization with the opposite handedness is not diffracted. Helical structures 808 also define the wavelength selectivity of PVH grating 800, as light with wavelength close to a helical pitch (e.g., helical pitch 812 in FIG. 8C) is diffracted while light with other wavelengths is not diffracted (or diffracted at a reduced efficiency).

In some embodiments, reflectivity of a PVH grating is dependent on a thickness and/or duty cycle of the grating. For example, a PVH grating with a greater thickness may have a greater reflectivity. For example, a PVH grating with a greater duty cycle may have a greater reflectivity.

Figure 8E:
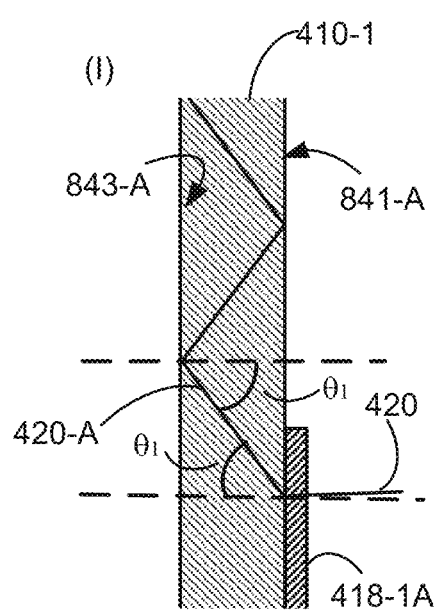
FIG. 8E is a schematic diagram illustrating a transmission polarization volume grating in accordance with some embodiments.
Figure 8F:
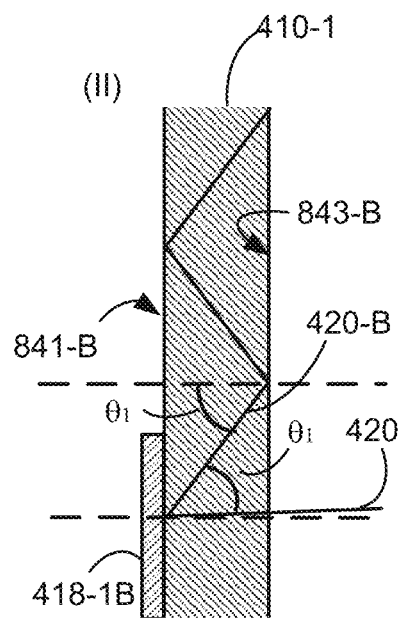
FIG. 8F is a schematic diagram illustrating a reflective polarization volume grating in accordance with some embodiments.

FIG. 8E is a schematic diagram illustrating a transmission polarization volume grating 418-1A in accordance with some embodiments, and FIG. 8F is a schematic diagram illustrating a reflective polarization volume grating 418-1B in accordance with some embodiments. In-coupler 418-1 described with respect to FIGS. 4A-4C can be a transmission grating shown in FIG. 8E or a reflective grating shown in FIG. 8F. In FIGS. 8E and 8F, transmission grating 418-1A and reflective grating 418-1B are coupled with waveguide 410-1. Either transmission grating 418-1A or reflective grating 418-1B can be used as an in-coupler of projection device 400. Transmission grating 418-1A and reflective grating 418-1B are each configured to transmit light having a particular polarization without changing its direction or polarization. Transmission grating 418-1A is further configured to transmit and redirect light having a polarization orthogonal to the particular polarization. In some embodiments, transmission grating 418-1A changes the polarization of the redirected light (e.g., to the particular polarization). Reflective grating 418-1B is further configured to reflect the light having a polarization orthogonal to the particular polarization. In some embodiments, reflective grating 418-1B does not change the polarization of the redirected light. In FIG. 8E, transmission grating 418-1A is disposed on surface 841-A of waveguide 410-1, so that light 420 impinges on transmission grating 418-1A before propagating through any portion of waveguide 410-1. Transmission grating 418-1A is configured to redirect at least a portion of light 420 (e.g., light 420-A) such that such that light 420-A enters waveguide 410-1 and impinges on opposing surface 843-A of waveguide 410-1 at angle $\theta_1$ that is greater than the critical angle associated with waveguide 410-1. Light 420-A thereby undergoes total internal reflection and continues to propagate along waveguide 410-1. FIG. 8F shows reflective grating 418-1B disposed on surface 841-B of waveguide 410-1 so that light 420 propagates through waveguide 410-1 prior to impinging on reflective grating 418-1B. Reflective grating 418-1B is configured to reflect a portion of light 420 (e.g., light 420-B) toward opposing surface 843-B of waveguide 410-1 such that light 420-B impinges on opposing surface 843-B at incident angle $\theta_1$ that is greater than the critical angle associated with waveguide 410-1. Light 420-A thereby undergoes total internal reflection and continues to propagate along waveguide 410-1.

In some embodiments, transmission grating 418-1A or reflective grating 418-1B can be a thin film coated on a surface of waveguide 410-1 (e.g., surface 841-A or 841-B). In some embodiments, transmission grating 418-1A or reflective grating 418-1B can be at least partially embedded in waveguide 410-1.

In light of these principles, we now turn to certain embodiments.

In accordance with some embodiments, an optical device (e.g., projecting device 400 in FIG. 4A) includes a first waveguide having a first side and an opposing second side (e.g., waveguide 410-1 having sides 410-1A and 410-1B), a spatial light modulator (e.g., SLM 402) configured to project image light, one or more lenses (e.g., lens 404) disposed between the spatial light modulator and the first waveguide, and a first in-coupler coupler (e.g., in-coupler 418-1) coupled with the first waveguide. The spatial light modulator is positioned on the first side of the first waveguide. The first in-coupler is positioned to receive the image light projected by the spatial light modulator and transmitted through the one or more lenses and to redirect at least a first portion of the image light so that the first portion of the image light enters the first waveguide and undergoes total internal reflection inside the first waveguide (e.g., FIG. 4B).

In some embodiments, the one or more lenses include a positive field lens (e.g., lens 404 is a positive field lens).

In some embodiments, chief rays from the spatial light modulator are parallel to one another at least between the one or more lenses and the spatial light modulator (e.g., chief rays 421-1, 421-2, 421-3 are parallel to one another between lens 404 and SLM 402 in FIG. 4B). A chief ray is a ray that extends from a respective position on the spatial light modulator to a center of an aperture spot, such as a center of in-coupler 418-1 (or an illuminated portion of the first waveguide). In some embodiments, the chief rays are parallel to an optical axis of the one or more lenses (e.g., optical axis 402-1 in FIG. 4A). This configuration is sometimes called a telecentric configuration.

In some embodiments, the optical device further includes a first reflector positioned on the second side of the first waveguide (e.g., reflector 412 in FIG. 4A). The first reflector is positioned to receive the image light projected by the spatial light modulator and transmitted through the one or more lenses, the first waveguide, and the first in-coupler (e.g., FIG. 4B). The first reflector is positioned to reflect the image light toward the first in-coupler so that the first in-coupler redirects at least the first portion of the image light to enter the first waveguide.

In some embodiments, the first reflector includes a negative meniscus lens coupled with a reflective surface (e.g., reflector 412 is a reflective surface coupled with lens 414 as shown in FIG. 4B), and the first reflector is further configured to focus the image light as the light is reflected. For example, image light reflected by the first reflector is more collimated than the image light received by the first reflector.

In some embodiments, the first in-coupler is further configured to transmit the image light from the one or more lenses toward the first reflector without changing its direction (e.g., in-coupler 418-1 in FIG. 4B transmits light from lens 404 toward reflector 412).

In some embodiments, the first in-coupler is a polarization-selective element selected from the group consisting of: a liquid-crystal-based polarization-selective element, a polarization-selective element including a metasurface, a polarization-selective element including a resonant structured surface, a polarization-selective element including a continuous chiral layer, and a polarization-selective element including a birefringent material.

In some embodiments, the first portion of the image light (e.g., light 420-A in FIG. 4D) has a first wavelength range and a second portion of the image light (e.g., light 420-B) has a second wavelength range distinct from the first wavelength range. The first in-coupler is configured to transmit the second portion of the image light.

In some embodiments, the optical device further includes a second waveguide (e.g., waveguide 410-2 in FIG. 4A) disposed between the one or more lenses and the first waveguide and a second in-coupler (e.g., in-coupler 418-2) coupled with the second waveguide. The second in-coupler is positioned to receive the second portion of the image light (e.g., light 420-B in FIG. 4D) transmitted through the first in-coupler and redirect a third portion of the image light (e.g., light 420-C) so that the third portion of the image light enters the second waveguide and undergoes total internal reflection inside the second waveguide, the third portion of the image light including at least a portion of the second portion of the image light.

In some embodiments, the optical device further includes a polarization-selective reflector (e.g., polarization-selective reflector 408 in FIG. 4A) positioned to receive from the one or more lenses the image light projected by the spatial light modulator. The polarization-selective reflector has a polarization-selective reflective surface in an orientation that is non-perpendicular to an optical axis of the spatial light modulator (e.g., polarization-selective reflector 408 is non-perpendicular to optical axis 402-1).

In some embodiments, the optical device further includes an illumination source (e.g., illumination source 602 in FIG. 6A) positioned to output illumination light toward the polarization-selective reflective surface. The polarization-selective reflector is positioned to receive the illumination light from the illumination source in an orientation that is non-perpendicular to the polarization-selective reflective surface (e.g., polarization-selective reflector 408 is non-perpendicular to optical axis 602-1).

In some embodiments, the illumination source includes an array of light emitting devices optically coupled with an array of tapered integrators configured to converge light output by the array of light emitting devices (e.g., FIG. 6D).

In some embodiments, the optical device further includes a second reflector (e.g., reflector 606 in FIG. 6B). The polarization-selective reflector is positioned to receive the illumination light (e.g., light 608-1 and 608-2) from the illumination source and provide the illumination light in a first direction toward the second reflector. The polarization-selective reflector is further positioned to receive the illumination light reflected off the second reflector and provide the illumination light toward the spatial light modulator in a second direction distinct from the first direction and receive the image light projected from the spatial light modulator and transmitted through the one or more lenses. The polarization-selective reflector is also positioned to provide the image light (e.g., light 420 in FIG. 6C) received from the spatial light modulator in a fourth direction toward the first waveguide. The third direction is distinct from the first direction and the second direction.

In some embodiments, the optical device further includes (i) a reflective polarizer (e.g., reflective polarizer 710 in FIG. 7B) positioned between the illumination source (e.g., illumination source 702) and the polarization-selective reflector (e.g., polarization-selective reflector 408) and (ii) a reflective surface with an aperture (e.g., reflective surface 706 with aperture 708). The reflective surface is positioned relative to the illumination source so that the illumination light (e.g., light 712) from the illumination source propagates through the aperture toward the reflective polarizer. The reflective polarizer reflects at least a first portion of the illumination light (e.g., light 712-A) toward the reflective surface, the reflective surface reflects at least a second portion of the illumination light back toward the reflective polarizer and the reflective polarizer receives the second portion of the illumination light and transmits at least a third portion (e.g., light 712-B) of the illumination light toward the polarization-selective reflective surface of the polarization-selective reflector.

In some embodiments, the polarization-selective reflector is positioned to receive the third portion of the illumination light (e.g., light 712-B shown in FIG. 7B) from the reflective polarizer and provide the third portion of the illumination light in a fourth direction toward the spatial light modulator (e.g., light 712-C shown in FIG. 7B). The polarization-selective reflector is further positioned to receive the image light projected from the spatial light modulator and transmitted through the one or more lenses in a fifth direction distinct from the fourth direction. The polarization-selective reflector is also positioned to provide the image light (e.g., light 420) received from the spatial light modulator in a sixth direction toward the first waveguide. The sixth direction is distinct from the fourth direction and the fifth direction.

In accordance with some embodiments, a head-mounted display device (e.g., display device 450 in FIG. 4C) includes the optical device and one or more output couplers (e.g., output coupler 454-1) coupled with the first waveguide and positioned at a distance from the first in-coupler. The one or more output couplers are configured to redirect at least a portion of the first portion of the image light out of the first waveguide (e.g., light 456).

In some embodiments, the image light projected by the spatial light modulator corresponds to one or more images. The first waveguide is further configured to transmit light (e.g., light 458) from one or more objects located outside the head-mounted display device such that the one or more images overlap with the light from the one or more objects.

In accordance with some embodiments, a method is performed at an optical device (e.g., FIG. 4B). The optical device includes projecting, with a spatial light modulator, image light, and receiving, with a first in-coupler coupled with a first waveguide, the image light projected by the spatial light modulator and transmitted through one or more lenses. The method also includes redirecting, with the first in-coupler, at least a first portion of the image light so that the first portion of the image light enters the first waveguide and undergoes total internal reflection inside the first waveguide. The first waveguide has a first side and an opposing second side. The spatial light modulator is positioned on the first side of the first waveguide, and the one or more lenses are disposed between the spatial light modulator and the first waveguide.

In some embodiments, the one or more lenses include a positive field lens (e.g., lens 404 in FIG. 4B).

In some embodiments, chief rays from the spatial light modulator are parallel to one another at least between the one or more lenses and the first in-coupler (e.g., FIG. 4B).

In accordance with some embodiments, an optical device (e.g., projection device 500 in FIG. 5A) includes a spatial light modulator (e.g., SLM 402) configured to project image light, a diffractive lens (e.g., diffractive lens 508), and a polarization-selective reflector (e.g., polarization-selective reflector 408). The spatial light modulator defines an optical axis (e.g., optical axis 402-1). The diffractive lens is positioned to receive the image light (e.g., light 516-1, 516-2, and 516-3 in FIG. 5B) from the spatial light modulator. The polarization-selective reflector is positioned to receive the image light from the diffractive lens. The polarization-selective reflector having a polarization-selective reflective surface in an orientation that is non-perpendicular to the optical axis of the spatial light modulator (e.g., polarization-selective reflector 408 is non-perpendicular to optical axis 402-1).

In some embodiments, chief rays from the spatial light modulator are parallel to one another at least between the spatial light modulator and the diffractive lens (e.g., chief rays 515-1, 515-2, 515-3, 515-4, and 515-5 are parallel to one another between SLM 402 and diffractive lens 508 in FIG. 5C).

In some embodiments, a first ray (e.g., chief ray 515-3) from the spatial light modulator impinges on a first region of the diffractive lens (e.g., location 508-C) positioned at a first distance from an optical axis of the diffractive lens (e.g., optical axis 402-1). A second ray (e.g., chief ray 515-2) from the spatial light modulator impinges on a second region of the diffractive lens (e.g., location 508-B) positioned at a second distance distinct from the first distance from the optical axis of the diffractive lens. The diffractive lens is configured to steer the first ray and the second ray toward a common focal point (e.g., focal point 518-1) located on the optical axis of the diffractive lens.

In some embodiments, the diffractive lens is an axisymmetric lens (e.g., diffractive lens 508 is axisymmetric in FIG. 5B).

In some embodiments, the optical device further includes a first set of one or more lenses (e.g., lens 514 in FIG. 5B) positioned between the diffractive lens and the polarization-selective reflector. In some embodiments, the first set of one or more lenses is positioned to receive the image light from the diffractive lens and provide the image light toward the polarization-selective reflector. In some embodiments, the first set of one or more lenses includes a negative field lens (e.g., lens 514 is a negative field lens).

In some embodiments, the optical device further includes a waveguide (e.g., waveguide 410 in FIG. 5B) positioned to receive the image light from the polarization-selective reflector.

In some embodiments, the optical device further includes a second set of one or more lenses (e.g., lens set 512 in FIG. 5B) positioned between the polarization-selective reflector and the waveguide. In some embodiments, the second set of one or more lenses is positioned to receive the image light from the polarization-selective reflective surface and provide the image light toward the waveguide.

In some embodiments, the optical device further includes an illumination source (e.g., FIG. 6B) positioned to output illumination light toward the polarization-selective reflective surface. The optical device also includes a reflector positioned to receive the illumination light from the polarization-selective reflective surface and redirect the illumination light back to the polarization-selective reflective surface.

In some embodiments, the illumination source includes an array of light emitting devices coupled with an array of tapered integrators configured to converge the illumination light output by the illumination source (e.g., FIG. 6D).

In some embodiments, the polarization-selective reflective surface (e.g., polarization-selective reflector 408) is configured to transmit light having a first polarization and reflect light having a second polarization distinct from (e.g., orthogonal to) the first polarization.

In some embodiments, the polarization-selective reflector is positioned to receive the illumination light from the illumination source and provide the illumination light in a first direction toward the reflector (e.g., FIGS. 6B and 6C). The polarization-selective reflector is also positioned to receive the illumination light reflected off the reflector and direct the illumination light toward the spatial light modulator in a second direction distinct from the first direction. The polarization-selective reflector is further positioned to receive the image light projected from the spatial light modulator and transmitted through the diffractive lens and provide the image light received from the spatial light modulator in a third direction toward the waveguide. The third direction is distinct from the first direction and the second direction.

In some embodiments, the optical device further includes (i) a reflective polarizer positioned between the illumination source and the polarization-selective reflector and (ii) a reflective surface with an aperture (e.g., reflective polarizer 710 and reflective surface 706 with aperture 708 as shown in FIG. 7B). The reflective surface is positioned relative to the illumination source so that the illumination light from the illumination source propagates through the aperture toward the reflective polarizer. The reflective polarizer reflects at least a first portion of the illumination light toward the reflective surface and the reflective surface reflects at least a second portion of the illumination light back toward the reflective polarizer. The reflective polarizer receives the second portion of the illumination light and transmits at least a third portion of the illumination light toward the polarization-selective reflective surface of the polarization-selective reflector.

In some embodiments, the polarization-selective reflector is positioned to receive the third portion of the illumination light from the reflective polarizer and provide the third portion of the illumination light in a fourth direction toward the spatial light modulator (e.g., FIGS. 7B and 7C). The polarization-selective reflector is also positioned to receive the image light projected from the spatial light modulator and transmitted through the diffractive lens in a fifth direction distinct from the fourth direction. The polarization-selective reflector is further positioned to provide the image light received from the spatial light modulator in a sixth direction toward the waveguide. The sixth direction is distinct from the fourth direction and the fifth direction.

In some embodiments, the spatial light modulator is a Liquid Crystal on Silicon display.

In accordance with some embodiments, a method includes projecting, with a spatial light modulator defining an optical axis, image light, and receiving, with a diffractive lens, the image light from the spatial light modulator (e.g., FIG. 5B). The method also includes receiving, with a polarization-selective reflector, the image light from the diffractive lens. The polarization-selective reflector has a polarization-selective reflective surface positioned in an orientation that is non-perpendicular to the optical axis of the spatial light modulator.

In some embodiments, receiving, with the diffractive lens, the image light from the spatial light modulator includes receiving chief rays from the spatial light modulator that are parallel to one another (e.g., FIG. 5C).

In some embodiments, the diffractive lens is an axisymmetric lens (e.g., portions having a same distance from a center of the diffractive lens are configured to steer light by a same angle).

In some embodiments, the method further includes receiving, with a first set of one or more lenses, the image light from the diffractive lens and providing, with the first set of one or more lenses, the image light toward the polarization-selective reflector (e.g., FIG. 5B).

In some embodiments, receiving, with a waveguide, the image light from the polarization-selective reflector (e.g., FIG. 5B).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, projection illumination device 400 may include one or more features described with respect to illumination device 500, and vice versa. In addition, illumination device 600 may include one or more features described with respect to illumination device 700, and vice versa. Furthermore, illumination device 600 and illumination device 700 may include one or more features described with respect to projection device 400 and projection device 500. For brevity, such details are not repeated herein. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   a spatial light modulator configured to project image light, the spatial light modulator defining an optical axis;
   a diffractive lens positioned to receive the image light from the spatial light modulator; and
   a polarization-selective reflector positioned to receive the image light from the diffractive lens, the polarization-selective reflector having a polarization-selective reflective surface in an orientation that is non-perpendicular to the optical axis of the spatial light modulator.

2. The optical device of claim 1, wherein chief rays from the spatial light modulator are parallel to one another at least between the spatial light modulator and the diffractive lens.

3. The optical device of claim 1, wherein:
   a first ray from the spatial light modulator impinges on a first region of the diffractive lens positioned at a first distance from an optical axis of the diffractive lens;
   a second ray from the spatial light modulator impinges on a second region of the diffractive lens positioned at a second distance distinct from the first distance from the optical axis of the diffractive lens; and
   the diffractive lens is configured to steer the first ray and the second ray toward a common focal point located on the optical axis of the diffractive lens.

4. The optical device of claim 1, wherein the diffractive lens is an axisymmetric lens.

5. The optical device of claim 1, further comprising a first set of one or more lenses positioned between the diffractive lens and the polarization-selective reflector.

6. The optical device of claim 5, wherein the first set of one or more lenses includes a negative field lens.

7. The optical device of claim 1, further comprising:
   a waveguide positioned to receive the image light from the polarization-selective reflector.

8. The optical device of claim 7, further comprising:
   a second set of one or more lenses positioned between the polarization-selective reflector and the waveguide.

9. The optical device of claim 7, further comprising:
   an illumination source positioned to output illumination light toward the polarization-selective reflective surface; and
   a reflector positioned to receive the illumination light from the polarization-selective reflective surface and redirect the illumination light back to the polarization-selective reflective surface.

10. The optical device of claim 9, wherein the illumination source includes an array of light emitting devices coupled with an array of tapered integrators.

11. The optical device of claim 9, wherein:
    the polarization-selective reflective surface is configured to transmit light having a first polarization and reflect light having a second polarization distinct from the first polarization.

12. The optical device of claim 9, wherein the polarization-selective reflector is positioned to:
    receive the illumination light from the illumination source and provide the illumination light in a first direction toward the reflector;
    receive the illumination light reflected off the reflector and direct the illumination light toward the spatial light modulator in a second direction distinct from the first direction;
    receive the image light projected from the spatial light modulator and transmitted through the diffractive lens; and
    provide the image light received from the spatial light modulator in a third direction toward the waveguide, wherein the third direction is distinct from the first direction and the second direction.

13. The optical device of claim 9, further comprising (i) a reflective polarizer positioned between the illumination source and the polarization-selective reflector and (ii) a reflective surface with an aperture, the reflective surface positioned relative to the illumination source so that the illumination light from the illumination source propagates through the aperture toward the reflective polarizer, the reflective polarizer reflects at least a first portion of the illumination light toward the reflective surface, the reflective surface reflects at least a second portion of the illumination light back toward the reflective polarizer, and the reflective polarizer receives the second portion of the illumination light and transmits at least a third portion of the illumination light.

14. The optical device of claim 13, wherein the polarization-selective reflector is positioned to:
    receive the third portion of the illumination light from the reflective polarizer and provide the third portion of the illumination light in a fourth direction toward the spatial light modulator;
    receive the image light projected from the spatial light modulator and transmitted through the diffractive lens in a fifth direction distinct from the fourth direction; and
    provide the image light received from the spatial light modulator in a sixth direction toward the waveguide, wherein the sixth direction is distinct from the fourth direction and the fifth direction.

15. The optical device of claim 1, wherein the spatial light modulator is a Liquid Crystal on Silicon display.

16. A method comprising:
    projecting, with a spatial light modulator defining an optical axis, image light;
    receiving, with a diffractive lens, the image light from the spatial light modulator; and
    receiving, with a polarization-selective reflector, the image light from the diffractive lens, wherein the polarization-selective reflector has a polarization-selective reflective surface positioned in an orientation that is non-perpendicular to the optical axis of the spatial light modulator.

17. The method of claim 16, wherein receiving, with the diffractive lens, the image light from the spatial light modulator includes receiving chief rays from the spatial light modulator that are parallel to one another.

18. The method of claim 16, wherein the diffractive lens is an axisymmetric lens.

19. The method of claim 16, further comprising:
    receiving, with a first set of one or more lenses, the image light from the diffractive lens; and
    providing, with the first set of one or more lenses, the image light toward the polarization-selective reflector.

20. The method of claim 16, further comprising:
    receiving, with a waveguide, the image light from the polarization-selective reflector.

* * * * *